(12) United States Patent
Marovets

(10) Patent No.: US 8,897,820 B2
(45) Date of Patent: Nov. 25, 2014

(54) SYSTEM, METHOD, AND APPARATUS FOR STORING, TRANSMITTING, RECEIVING, AND USING STRUCTURED DATA USING UN-STRUCTURED TEXT MESSAGE BODIES

(76) Inventor: Jack L. Marovets, Cedar Rapids, IA (US)

( * ) Notice: Subject to any disclaimer, the term of this patent is extended or adjusted under 35 U.S.C. 154(b) by 0 days.

(21) Appl. No.: 13/373,476

(22) Filed: Nov. 15, 2011

(65) Prior Publication Data
US 2013/0095864 A1 Apr. 18, 2013

Related U.S. Application Data

(60) Provisional application No. 61/456,990, filed on Nov. 16, 2010, provisional application No. 61/571,061, filed on Jun. 20, 2011, provisional application No. 61/573,547, filed on Sep. 8, 2011, provisional application No. 61/465,166, filed on Mar. 15, 2011.

(51) Int. Cl.
*H04W 40/00* (2009.01)
*H04W 4/14* (2009.01)
*H04W 8/24* (2009.01)
*G06Q 10/06* (2012.01)

(52) U.S. Cl.
CPC ............... *H04W 4/14* (2013.01); *H04W 8/245* (2013.01); *G06Q 10/063112* (2013.01)
USPC ........ 455/466; 455/550.1; 455/418; 705/14.1

(58) Field of Classification Search
CPC ... H04W 8/245; H04W 4/14; H04M 1/72519; G06Q 10/063112
USPC ........... 455/466, 550.1, 422.1, 418; 340/10.1; 705/14.46
See application file for complete search history.

(56) References Cited

U.S. PATENT DOCUMENTS

| | | | |
|---|---|---|---|
| 2005/0004840 A1* | 1/2005 | Wanninger | 705/14 |
| 2007/0248055 A1* | 10/2007 | Jain et al. | 370/331 |
| 2009/0061884 A1* | 3/2009 | Rajan et al. | 455/445 |
| 2010/0060422 A1* | 3/2010 | Van Nest et al. | 340/10.1 |
| 2010/0121697 A1* | 5/2010 | Lin et al. | 705/14.14 |
| 2010/0229081 A1* | 9/2010 | Rothbucher | 715/205 |
| 2010/0229082 A1* | 9/2010 | Karmarkar et al. | 715/205 |
| 2011/0106613 A1* | 5/2011 | Felt et al. | 705/14.46 |

* cited by examiner

*Primary Examiner* — Danh Le
(74) *Attorney, Agent, or Firm* — McKee, Voorhees & Sease

(57) ABSTRACT

The present invention relates to the use of unstructured and untagged text message protocols to form a text message body that can be used to transmit and receive semi-structured, or structured text message bodies, which optionally may also use various, widely used Markup Languages. The semi-structure, or structure used within the text message body can be a format, such as, but not limited to, partitioning and/or comma delimited values, etc. The tagging for use with the text message body can be a protocol, such as, but not limited to, Extensible Markup Language (XML).

8 Claims, No Drawings

SYSTEM, METHOD, AND APPARATUS FOR STORING, TRANSMITTING, RECEIVING, AND USING STRUCTURED DATA USING UN-STRUCTURED TEXT MESSAGE BODIES

CROSS-REFERENCE TO RELATED APPLICATIONS

This application claims priority to U.S. Provisional Patent Application Ser. No. 61/456,990, to Jack Marovets, entitled System, Method, And Apparatus For Cellphones Or Smart Phones As Virtual RFID And/Or Bar Code Tag Encodings; U.S. Provisional Patent Application Ser. No. 61/465,166, to Jack Marovets, entitled System, Method, And Apparatus For Integrating Real World And Virtual World Advertising And Marketing; U.S. Provisional Patent Application Ser. No. 61/571,061, to Jack Marovets, entitled Improved System, Method, And Apparatus For integrating Real World And Virtual World Advertising And Marketing Using Hard Copy And Soft Copy Materials In A Hybrid Manner; and U.S. Provisional Patent Application Ser. No. 61/573,547, to Jack Marovets, entitled System, Method, And Apparatus For Integrating Real World And Virtual World Advertising And Marketing all which are herein incorporated by reference.

FIELD OF THE INVENTION

The present invention relates to the use of various, widely used unstructured and untagged text message protocols to form a text message body that can be used to transmit and receive semi-structured, or structured text message bodies, which optionally may also use various, widely used Markup Languages. The semi-structure, or structure used within the text message body can be a format, such as, but not limited to, partitioning and/or comma delimited values, etc. The tagging for use with the text message body can be a protocol, such as, but not limited to, Extensible Markup Language (XML).

PRIOR ART

In the current art, there are several technologies used for transmitting and receiving text messages, structuring data in message bodies, and tagging data using a Markup Language within message bodies.

One form of sending and receiving text messages is known as Short Message Service (SMS) is a globally used wireless service that enables the transmission of alpha-numeric text messages between mobile subscribers and external systems such as, but not limited to, electronic mail, paging, voice-mail systems, etc.

SMS provides a means for transmitting and receiving short messages to and from wireless devices, such as, but not limited to, a cellphone, etc. SMS uses an SMSC (Short Message Service Center), which functions as a store-and-forward system for short messages. Wireless networks provide the means needed to locate a mobile subscriber(s) device, and transport short messages between the SMSCs and a mobile subscriber(s). SMS also supports several input means that allow interconnection with different message sources and destinations.

SMS allows an active mobile handset to receive or transmit a short message at any time, typically independent of whether a voice or data call is already in progress. SMS also guarantees delivery of the short message by the network. Temporary failures due to unavailable receiving stations are identified, and the short message is stored in the SMSC until the destination device becomes available.

SMS is an out-of-band packet delivery, low-bandwidth message transfer technology, which results in a highly efficient means for transmitting short bursts of data. Initial applications of SMS focused on eliminating alpha-numeric pagers by permitting two-way general-purpose messaging and notification services, primarily for voice mail. As technology and networks evolved, a variety of services have been introduced, including e-mail, fax, and paging integration, interactive banking, data services such as stock quotes, and integration with Internet-based applications. Wireless data applications include downloading of subscriber identity module (SIM) cards for activation, debit, profile-editing purposes, wireless points of sale (POS's), and other field-service applications such as automatic meter reading, remote sensing, and location-based services. Additionally, integration with the Internet spurred the development of Web-based messaging and other interactive applications such as instant messaging, gaming, and chatting.

The benefits of SMS to subscribers center around convenience, flexibility, and seamless integration of messaging services and data access. From a person's perspective, the primary benefit is the ability to use the handset as an extension of the computer. SMS also eliminates the need for separate devices for messaging because services can be integrated into a single wireless device—the mobile terminal. These benefits normally depend on the applications that the service provider offers.

A Markup Language is a modern system for annotating text in such a way that is syntactically distinguishable from the text. Examples are structural markers, such as, but not limited to, Extensible Markup Language (XML) tags. Markup tags are typically omitted from the version of the text which is displayed for an end-user. Some Markup Languages, like HyperText Markup Language (HTML) have presentation semantics, meaning their specification prescribes how the structured data is to be presented, but other Markup Languages, like XML, have no predefined semantics.

There are three general categories of electronic markup: Presentational, procedural, and descriptive.

Presentational markup is that used by traditional word-processing systems, binary codes embedded in document text that produced the What a person See Is What a person Get (WYSIWYG) effect. Such markup is usually designed to be hidden from human users, even those who are authors or editors.

Procedural markup is embedded in text and provides instructions for programs that are to process the text. Well-known examples include troff, LaTeX, and PostScript; it is expected that the processor runs through the text from beginning to end, following the instructions as encountered. Text with such markup is often edited with the markup visible and directly manipulated by the author. Popular procedural-markup systems usually include programming constructs, such that macros or subroutines can be defined and invoked by name.

In Descriptive markup, the markup is used to label parts of the document rather than to provide specific instructions as to how they should be processed. The objective is to decouple the inherent structure of the document from any particular treatment or rendition of it. Such markup is often described as "semantic". An example of descriptive markup would be HTML's <cite> tag, which is used to label a citation.

There is considerable blurring of the lines between the types of markup. In modern word-processing systems, presentational markup is often saved in descriptive-markup-oriented systems such as XML, and then processed procedurally by implementations. The programming constructs in descriptive-markup systems such as TeX may be used to create higher-level markup systems which are more descriptive, such as LaTeX.

In recent years, a number of small and largely nonstandard Markup Languages have been developed to allow authors to create formatted text via web browsers, for use in wikis and web forums. These are sometimes called Lightweight Markup Languages. The Markup Language used by Wikipedia is one such nonstandard Markup Language.

There are many forms of structures that can be added to data, including Radio Frequency Identification (RFID), barcodes, Electronic Data Interchange (EDI), which can be described as partitioned data.

RFID is a technology that uses radio waves to transfer data from an electronic tag, called RFID tag or label, attached to an object, through a reader for the purpose of identifying and tracking the object. Some RFID tags can be read from several meters away and beyond the line of sight of the reader. The application of bulk reading enables an almost-parallel reading of tags.

The tag's data is stored electronically in a structured format. The RFID tag includes a small RF transmitter and receiver. An RFID reader transmits an encoded radio signal to interrogate the tag. The tag receives the message and responds with its identification data. Many RFID tags do not use a battery. Instead, the tag uses the radio energy transmitted by the reader as its energy source. The RFID system design includes a method of discriminating several tags that might be within the range of the RFID reader.

A number of organizations have set standards for RFID, including the International Organization for Standardization (ISO), the International Electrotechnical Commission (IEC), ASTM International, the DASH7 Alliance and EPCglobal. There are also several specific industries that have set guidelines including the Financial Services Technology Consortium (FTSC)

FSTC has set a standard for tracking IT assets using RFID, the Computer Technology Industry Association CompTIA has set a standard for certifying RFID engineers and the International Airlines Transport Association IATA set tagging guidelines for luggage in airports.

RFID can be used in many applications. A tag can be affixed to any object and used to track and manage inventory, assets, people, etc. For example, it can be affixed to cars, computer equipment, books, mobile phones, etc. The Healthcare industry has used RFID to reduce counting, looking for things and auditing items. Many financial institutions use RFID to track key assets and automate compliance. Also with recent advances in social media RFID is being used to tie the physical world with the virtual world. RFID in Social Media first came to light in 2010 with Facebook's annual conference.

RFID is a superior and more efficient way of identifying objects than manual system or use of barcode systems that have been in use since the 1970s. Furthermore, passive RFID tags (those without a battery) can be read if passed within close enough proximity to an RFID reader. It is not necessary to "show" the tag to the reader device, as with a barcode. In other words it does not require line of sight to "see" an RFID tag, the tag can be read inside a case, carton, box or other container, and unlike barcodes RFID tags can be read hundreds at a time. barcodes can only be read one at a time.

EPCglobal standards for encoding and formatting the Electronic Product Code (EPC) apply to both RFID tags, and barcode labels.

A barcode is an optical machine-readable representation of data, which shows data about the object to which it is attached. Originally, barcodes represented data by varying the widths and spacings of parallel lines, and may be referred to as linear or 1 dimensional (1D). Later they evolved into rectangles, dots, hexagons and other geometric patterns in 2 dimensions (2D). Although 2D systems use a variety of symbols, they are generally referred to as barcodes as well. Barcodes originally were scanned by special optical scanners called barcode readers; later, scanners and interpretive software became available on devices including desktop printers and smartphones.

Electronic data interchange (EDI) is the structured transmission of data between organizations by electronic means. It is used to transfer electronic documents or business data from one computer system to another computer system, as an example, from one trading partner to another trading partner without human intervention.

It is more than mere e-mail; for instance, organizations might replace bills of lading and even checks with appropriate EDI messages. It also refers specifically to a family of standards.

In 1996, the National Institute of Standards and Technology defined electronic data interchange as "the computer-to-computer interchange of strictly formatted messages that represent documents other than monetary instruments. EDI implies a sequence of messages between two parties, either of whom may serve as originator or recipient. The formatted data representing the documents may be transmitted from originator to recipient via telecommunications or physically transported on electronic storage media." It distinguishes mere electronic communication or data exchange, specifying that in EDI, the usual processing of received messages is by computer only. Human intervention in the processing of a received message is typically intended only for error conditions, for quality review, and for special situations. For example, the transmission of binary or textual data is not EDI as defined here unless the data are treated as one or more data elements of an EDI message and are not normally intended for human interpretation as part of online data processing.

EDI can be formally defined as the transfer of structured data, by agreed message standards, from one computer system to another without human intervention.

EDI is considered to be a technical representation of a business conversation between two entities, either internal or external. Note that there is a perception that "EDI" constitutes the entire electronic data interchange paradigm, including the transmission, message flow, document format, and software used to interpret the documents. EDI is considered to describe the rigorously standardized format of electronic documents. EDI is very useful in supply chain.

The EDI standards were designed to be independent of communication and software technologies. EDI can be transmitted using any methodology agreed to by the sender and recipient, a person's includes a variety of technologies, including modem (asynchronous and synchronous), FTP, e-mail, HTTP, AS1, AS2, etc. It is important to differentiate between the EDI documents and the methods for transmitting them. When they compared the synchronous protocol 2400 bit/s modems, CLEO devices, and value-added networks used to transmit EDI documents to transmitting via the Internet, some people equated the non-Internet technologies with EDI and predicted erroneously that EDI itself would be replaced along with the non-Internet technologies. These non-Internet transmission methods are being replaced by Internet protocols such as FTP, telnet, and e-mail, but the EDI documents themselves still remain.

As more trading partners use the Internet for transmission, standards have emerged. In 2002, the IETF published RFC 3335, offering a standardized, secure method of transferring EDI data via e-mail. On Jul. 12, 2005, an IETF working group ratified RFC4130 for MIME-based HTTP EDIINT AS2) transfers, and is preparing a similar RFC for FTP transfers AS3). While some EDI transmission has moved to these newer protocols, the providers of the value-added networks remain active.

EDI documents generally contain the same data that would normally be found in a paper document used for the same organizational function. For example an EDI 940 ship-from-warehouse order is used by a manufacturer to tell a warehouse to ship product to a retailer. It typically has a ship to address, bill to address, a list of product numbers (usually a UPC) and quantities. Another example is the set of messages between sellers and buyers, such as request for quotation (RFQ), bid in response to RFQ, purchase order, purchase order acknowledgment, shipping notice, receiving advice, invoice, and payment advice. However, EDI is not confined to just business data related to trade but encompasses all fields such as medicine (e.g., patient records and laboratory results), transport (e.g., container and modal data), engineering and construction, etc. In some cases, EDI will be used to create a new business data flow (that was not a paper flow before), a person's is the case in the Advanced Shipment Notification (856) which was designed to inform the receiver of a shipment, the goods to be received and how the goods are packaged.

Some major sets of EDI standards include:

1) The United Nations recommended UN/EDIFACT is the only international standard and is predominant outside of North America 2) The US standard ANSI ASC X12 (X12) is predominant in North America.

3) The TRADACOMS standard developed by the ANA (Article Numbering Association) is predominant in the UK retail industry.

4) The ODETTE standard used within the European automotive industry

All of these standards first appeared in the early to mid 1980s. The standards prescribe the formats, character sets, and data elements used in the exchange of business documents and forms. The complete X12 Document List includes all major business documents, including purchase orders (called "ORDERS" in UN/EDIFACT and an "850" in X12) and invoices (called "INVOIC" in UN/EDIFACT and an "810" in X12).

The EDI standard indicates which pieces of data are mandatory for a particular document, which pieces are optional and give the rules for the structure of the document. The standards are like building codes. Two EDI documents can follow the same standard and contain different sets of data. For example a food company may indicate a product's expiration date while a clothing manufacturer would choose to send color and size data.

What is needed is a system, method, and apparatus that uses standard unstructured and untagged text message bodies as a basis for encoding within the text message body semi-structured, or structured text message bodies, which optionally can use Markup Languages for a wide variety of uses in the world, including the dissemination of advertising, tokens, news, succinct answers to questions, etc.

FEATURES AND OBJECTS OF THE PRESENT INVENTION

It is an object of the present invention to use Markup Language tags and/or data structure encoded in text messages to provide a system, method, and apparatus for a marketing system including coupon exchange that links the real and virtual world.

It is a further object of the present invention to use Markup Language tags and/or structured or semi-structured data, which may use structures such as comma delimited values and/or partitions, encoded in text messages to provide a marketing hybrid real and virtual world marketing system including coupon exchange that uses real world free delivery.

It is a further object of the present invention to use Markup Language tags and/or structured or semi-structured data, which may use structures such as comma delimited values and/or partitions, encoded in text messages to provide a marketing hybrid real and virtual world marketing system including coupon exchange that uses real world free delivery to promote cross-branding.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote ambush marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote article marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote article video marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote digital marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote direct marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote diversity marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote mega-marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote multi-level marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote cause marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote close range marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote cloud marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote communal marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote consumer-generated marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote cross-media marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote customer advocacy marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote database marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote ethical marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote evangelism marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote Embodiment of merit marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote global marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote guerrilla marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote inbound marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote influencer marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote Internet marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote nano-campaign marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote next best action marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote permission marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote proximity marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote reality marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote relationship marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote shopper marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote undercover marketing.

It is a further object of the present invention to use Markup Language tags and/or structured or semi-structured data, which may use structures such as comma delimited values and/or partitions, encoded in text messages to provide marketing hybrid real and virtual world marketing system including coupon exchange that uses real world free delivery to promote loyalty marketing.

It is an even further object of the present invention to use Markup Language tags and/or structured or semi-structured data, which may use structures such as comma delimited values and/or partitions, encoded in text messages to provide on-demand printing by a business for use in conjunction with real world free delivery, including use for coupon exchange.

It is an even further object of the present invention to use Markup Language tags and/or structured or semi-structured data, which may use structures such as comma delimited values and/or partitions, encoded in text messages to provide a marketing system including coupon exchange that can be used by a business to fill in the peaks and valleys of customer flow into a brick-and-mortar facility, including use for coupon exchange.

It is an even further object of the present invention to use Markup Language tags and/or structured or semi-structured data, which may use structures such as comma delimited values and/or partitions, encoded in text messages to provide at least one Wi-Fi broadcast channel for the purpose of delivering local advertising and marketing data to a Wi-Fi enabled device, including use for coupon exchange.

It is an even further object of the present invention to use Markup Language tags and/or structured or semi-structured data, which may use structures such as comma delimited values and/or partitions, encoded in text messages to provide a web-based interface that allows a customer to choose the basic color of a web-site in order for advertisers and marketers to make inferences into a customer's personality, including use for coupon exchange.

It is an even further object of the present invention to use Markup Language tags and/or structured or semi-structured data, which may use structures such as comma delimited values and/or partitions, encoded in text messages to provide bar codes as a means of exchanging data to enabled scanning devices, and to launch web-based applications, and mobile applications to enable coupon exchange.

It is an even further object of the present invention to use Markup Language tags and/or structured or semi-structured data, which may use structures such as comma delimited values and/or partitions as a means of exchanging data to enabled scanning devices, and to launch web-based applications to enable coupon exchange.

It is an even further object of the present invention to use Markup Language tags and/or structured or semi-structured data, which may use structures such as comma delimited values and/or partitions as a means of exchanging data to enabled scanning devices, and to launch web-based applications to enable coupon exchange.

It is an even further object of the present invention to use Markup Language tags and/or structured or semi-structured data, which may use structures such as comma delimited values and/or partitions, encoded in text messages to use mobile bar codes on video displays as a means of exchanging data to enabled scanning devices, and to launch web-based applications to enable coupon exchange.

It is an even further object of the present invention to use Markup Language tags and/or structured or semi-structured data, which may use structures such as comma delimited values and/or partitions as a means of exchanging data to enabled scanning devices, to launch web-based applications to enable coupon exchange.

It is an even further object of the present invention to use Markup Language tags and/or structured or semi-structured data, which may use structures such as comma delimited values and/or partitions, encoded in text messages to use HTML5 as a means to provide functionality, including use for coupon exchange.

It is an even further object of the present invention to use Markup Language tags and/or structured or semi-structured data, which may use structures such as comma delimited values and/or partitions, encoded in text messages to use extensible mark-up language (XML) as a means to provide functionality, including use for coupon exchange.

It is an even further object of the present invention to use Markup Language tags and/or structured or semi-structured data, which may use structures such as comma delimited values and/or partitions, encoded in text messages to use cascading style sheets (CSS) as a means to provide functionality, including use for coupon exchange.

It is an even further object of the present invention to use Markup Language tags and/or structured or semi-structured data, which may use structures such as comma delimited values and/or partitions, encoded in text messages to use short codes as a means to provide functionality, including use for coupon exchange.

It is an even further object of the present invention to use Markup Language tags and/or structured or semi-structured data, which may use structures such as comma delimited values and/or partitions, encoded in text messages to provide web-based applications for consumers, businesses, advertisers, and marketers as a means to provide functionality, including use for coupon exchange.

It is an even further object of the present invention to use Markup Language tags and/or structured or semi-structured data, which may use structures such as comma delimited values and/or partitions, encoded in text messages to provide mobile applications to access web-based applications for consumers, businesses, advertisers, and marketers as a means to provide functionality, including use for coupon exchange.

It is an even further object of the present invention to use Markup Language tags and/or structured or semi-structured data, which may use structures such as comma delimited values and/or partitions, encoded in text messages to use short messaging services (SMS) as a means to provide functionality.

It is an even further object of the present invention to use Markup Language tags and/or structured or semi-structured data, which may use structures such as comma delimited values and/or partitions, encoded in text messages to use multimedia messaging services (MMS) as a means to provide functionality, including use for coupon exchange.

It is an even further object of the present invention to use Markup Language tags and/or structured or semi-structured data, which may use structures such as comma delimited values and/or partitions, encoded in text messages to use the Google Android OS as a means to provided functionality, including use for coupon exchange.

It is an even further object of the present invention to use Markup Language tags and/or structured or semi-structured data, which may use structures such as comma delimited values and/or partitions, encoded in text messages to use the Nokia Symbian OS as a means to provided functionality, including use for coupon exchange.

It is an even further object of the present invention to use Markup Language tags and/or structured or semi-structured data, which may use structures such as comma delimited values and/or partitions, encoded in text messages to use the Apple iOS as a means to provided functionality, including use for coupon exchange.

It is an even further object of the present invention to use Markup Language tags and/or structured or semi-structured data, which may use structures such as comma delimited values and/or partitions, encoded in text messages to use the Rim Blackberry OS as a means to provided functionality, including use for coupon exchange.

It is an even further object of the present invention to use Markup Language tags and/or structured or semi-structured data, which may use structures such as comma delimited values and/or partitions, encoded in text messages to use the Microsoft Windows Phone OS as a means to provided functionality, including use for coupon exchange.

It is an even further object of the present invention to use Markup Language tags and/or structured or semi-structured data, which may use structures such as comma delimited values and/or partitions, encoded in text messages to use the Samsung Bada OS as a means to provided functionality, including use for coupon exchange.

It is an even further object of the present invention to use Markup Language tags and/or structured or semi-structured data, which may use structures such as comma delimited values and/or partitions, encoded in text messages to use the Nokia Maemo OS as a means to provided functionality, including use for coupon exchange.

It is an even further object of the present invention to use Markup Language tags and/or structured or semi-structured data, which may use structures such as comma delimited values and/or partitions, encoded in text messages to use the Nokia Meego OS as a means to provided functionality, including use for coupon exchange.

It is an even further object of the present invention to use Markup Language tags and/or structured or semi-structured data, which may use structures such as comma delimited values and/or partitions, encoded in text messages to provide free delivery of hard copy advertising and marketing materials on any surface of a delivery pizza boxes that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery of hard copy advertising and marketing materials on any surface of any type box that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery of hard copy advertising and marketing materials on any surface of any type can that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery of hard copy advertising and marketing materials on any surface of any type bottle that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery of hard copy advertising and marketing materials on any surface of disposable coffee cups that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery of hard copy advertising and marketing materials on any surface of disposable coffee cup wrappers that can be optionally linked to a web-based application to enable coupon exchange.

It is an even further object of the present invention to use Markup Language tags and/or structured or semi-structured data, which may use structures such as comma delimited values and/or partitions, encoded in text messages to provide free delivery by United Parcel Service (UPS) of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by FedEx of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by United States Postal Service (USPS) of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by taxi drivers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by bus drivers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by Girl Scouts delivering Girl Scout Cookie orders of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery of hard copy advertising and marketing materials pre-printed and/or printed on demand on the front and/or back of store receipts that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by school bus drivers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by taxi drivers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by repairmen of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by flower delivery drivers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by couriers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by laundry delivery drivers of hard copy advertising and marketing materials that can optionally be linked to a web-based application via any type of Internet connection, including a mobile-based application enable coupon exchange.

It is an even further object of the present invention to use Markup Language tags and/or structured or semi-structured data, which may use structures such as comma delimited values and/or partitions, encoded in text messages to provide free delivery by newspaper delivery persons of hard copy advertising and marketing materials in a newspaper, or separately from a newspaper, that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by Schwan's delivery drivers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by furniture delivery drivers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by carpet cleaner drivers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by ice cream truck drivers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by utility meter readers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by parking meter readers of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by garbage collection personnel of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by home marketing persons, such as people that sell Mary Kay and Amway, of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by oil change stores of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by mechanics of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by automobile dealers of hard copy advertising and marketing materials at the time of delivery of an automobile, or the service of an automobile, that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by a book retailer of hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by shoe retailers of hard copy advertising and marketing materials on shoe boxes that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by shoe retailers of hard copy advertising and marketing materials not on shoe boxes that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by clothing manufacturers of hard copy advertising and marketing materials on clothing labels that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by churches of hard copy advertising and marketing materials on bulletins that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by churches of hard copy advertising and marketing materials inserted in bulletins that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by businesses of hard copy advertising and marketing materials on bills sent in the mail that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by businesses of hard copy advertising and marketing materials inserted in bills sent in the mail that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by businesses of hard copy advertising and marketing materials on bills sent in the mail that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by businesses of hard copy advertising and marketing materials inserted into magazines sent in the mail that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by businesses of hard copy advertising and marketing materials on magazines sent in the mail that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by states of hard copy advertising and marketing materials on lottery tickets that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by hotels of hard copy advertising and marketing materials on room keys that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by persons of hard copy advertising and marketing materials on business cards that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by companies that produce printer paper of hard copy advertising and marketing materials on printer paper that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by drivers in vehicles equipped with programmable, changeable rear window display device for advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery by the consumer by driving to places of business, such as, but not limited to, concerts, sporting events, stores, hotels, restaurants, bowling alleys, etc, in order to receive hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by an airline in order to receive hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a railroad in order to receive hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a car rental agency in order to receive hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a hotel in order to receive hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a restaurants in order to receive hard copy advertising and marketing materials on menus that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by restaurants in order to receive hard copy advertising and marketing materials on table tops that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by restaurants in order to receive hard copy advertising and marketing materials on electronic table tops that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a restaurants in order to receive hard copy advertising and marketing materials in a publication placed at a table that is not a menu that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by an restaurants in order to receive hard copy advertising and marketing materials in a publication placed at a table that is not a menu that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a grocery store in order to receive hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a doctor's office in order to receive hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a visiting nurse in order to receive hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a movie rental store in order to receive hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a beer company on beer bottles to provide fantasy league sports tokens in the form of advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide free delivery to a consumer by a beer company on beer bottles cooperating with pizza delivery companies on pizza delivery boxes to provide fantasy league sports tokens in the form of advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide language specific hard copy and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide a web-based application that allows for an advertiser to enter into a reverse auction for print on-demand advertising space on hard copy and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to provide a web-based application that allows for a consumer to enter into a reverse auction to receive offers for print on-demand space on hard copy advertising and marketing materials that can optionally be linked to a web-based application via any type of Internet connection, including a mobile-based application to enable coupon exchange.

It is an even further object of the present invention to use Markup Language tags and/or structured or semi-structured data, which may use structures such as comma delimited values and/or partitions, encoded in text messages to use location based service technologies as a means to provide functionality to enable coupon exchange.

It is an even further object of the present invention to use Markup Language tags and/or structured or semi-structured data, which may use structures such as comma delimited values and/or partitions, encoded in text messages to create a domain and sub-domains as a sub-web to specifically control access and data linked to hard copy advertising and marketing materials as a means to provide functionality to enable coupon exchange.

It is an even further object of the present invention to use Markup Language tags and/or structured or semi-structured data, which may use structures such as comma delimited values and/or partitions, encoded in text messages to create a domain and sub-domains as a sub-web to specifically control access through the use of telephone numbers as the primary means of accessing data linked to hard copy advertising and marketing materials as a means to provide functionality to enable coupon exchange.

It is an even further object of the present invention to use Markup Language tags and/or structured or semi-structured data, which may use structures such as comma delimited values and/or partitions, encoded in text messages to integrate the Facebook social network as a means to provide functionality to enable coupon exchange.

It is an even further object of the present invention to use Markup Language tags and/or structured or semi-structured data, which may use structures such as comma delimited values and/or partitions, encoded in text messages to integrate the Twitter social network as a means to provide functionality to enable coupon exchange.

It is an even further object of the present invention to use Markup Language tags and/or structured or semi-structured data, which may use structures such as comma delimited values and/or partitions, encoded in text messages to integrate the YouTube social network as a means to provide functionality to enable coupon exchange.

It is an even further object of the present invention to use Markup Language tags and/or structured or semi-structured data, which may use structures such as comma delimited values and/or partitions, encoded in text messages to integrate the LinkedIn social network as a means to provide functionality to enable coupon exchange.

It is an even further object of the present invention to use Markup Language tags and/or structured or semi-structured data, which may use structures such as comma delimited values and/or partitions, encoded in text messages to provide a web-based application that can be customized by an advertiser or marketer using programmable, customized filters as a means to provide functionality to enable coupon exchange.

It is an even further object of the present invention to use Markup Language tags and/or structured or semi-structured data, which may use structures such as comma delimited values and/or partitions, encoded in text messages to provide a web-based application, and corresponding mobile-based application that can be customized by a consumer using programmable, customized filters as a means to provide functionality to enable coupon exchange.

It is an even further object of the present invention to use and XML schema known as AdsML Markup Language, which is used for interchange of data between advertising systems.

It is an even further object of the present invention to use and XML schema known as Agricultural Ontology Service.

It is an even further object of the present invention to use and XML schema known as AIML Markup Language, which is used for creating artificial intelligence chatterbots.

It is an even further object of the present invention to use and XML schema known as Attention Profiling Markup Language (APML), which is a format for capturing a person's interests and dislikes.

It is an even further object of the present invention to use and XML schema known as Atom, which is a language used for web feeds.

It is an even further object of the present invention to use and XML schema known as Automated Test Markup Language (ATML), which defines a standard exchange medium for sharing data between components of automatic test systems.

It is an even further object of the present invention to use and XML schema known as Attention.xml.

It is an even further object of the present invention to use and XML schema known as aecXML, which is a Markup Language which uses Industry Foundation Classes to create a vendor-neutral means to access data generated by Building data Modeling.

It is an even further object of the present invention to use and XML schema known as Binary Format Description Language, which is an extension of XSIL which has added conditionals and the ability to reference files by their stream numbers, rather than by their public URLs.

It is an even further object of the present invention to use and XML schema known as Business Process Execution Language, which is a business process modeling language that is executable.

It is an even further object of the present invention to use and XML schema known as Basic Markup Language, which is an easy to use Markup Language.

It is an even further object of the present invention to use and XML schema known as Call Control eXtensible Markup Language, which is a standard designed to provide telephony support to VoiceXML.

It is an even further object of the present invention to use and XML schema known as CellML, which is a language describing mathematical models.

It is an even further object of the present invention to use and XML schema known as Channel Definition Format.

It is an even further object of the present invention to use and XML schema known as Chemical Markup Language.

It is an even further object of the present invention to use and XML schema known as Clinical Data Interchange Standards Consortium.

It is an even further object of the present invention to use and XML schema known as Clinical Document Architecture.

It is an even further object of the present invention to use and XML schema known as CMRL, which is a Markup Language for concise message content.

It is an even further object of the present invention to use and XML schema known as COLLADA, which is standard for exchanging digital assets among various graphics software applications.

It is an even further object of the present invention to use and XML schema known as Common Alerting Protocol (CAP).

It is an even further object of the present invention to use and XML schema known as CookSwing.

It is an even further object of the present invention to use and XML schema known as CXML, which is a protocol intended for communication of business documents between procurement applications, e-commerce hubs and suppliers.

It is an even further object of the present invention to use and XML schema known as Darwin data Typing Architecture.

It is an even further object of the present invention to use and XML schema known as Diag-ML for Integrated Diagnostics and Health Management.

It is an even further object of the present invention to use and XML schema known as dicML for monolingual and bilingual dictionaries.

It is an even further object of the present invention to use and XML schema known as Digital Forensics XML.

It is an even further object of the present invention to use and XML schema known as Dimensional Markup Language.

It is an even further object of the present invention to use and XML schema known as Directory Service Markup Language.

It is an even further object of the present invention to use and XML schema known as DisplayML.

It is an even further object of the present invention to use and XML schema known as DocBook: a Markup Language for technical documentation.

It is an even further object of the present invention to use and XML schema known as Document Schema Definition Language.

It is an even further object of the present invention to use and XML schema known as Document Structure Description, which is a schema language for XML.

It is an even further object of the present invention to use and XML schema known as DotML.

It is an even further object of the present invention to use and XML schema known as ebXML, which is a collection of Electronic Business specifications.

It is an even further object of the present invention to use and XML schema known as It is an even further object of the present invention to use and XML schema known as eLML, which is an eLesson Markup Language.

It is an even further object of the present invention to use and XML schema known as EMML Enterprise Mashup Markup Language.

It is an even further object of the present invention to use and XML schema known as ENML (eNotarization Markup Language).

It is an even further object of the present invention to use and XML schema known as EPPML (Extensible Postal Product Model and Language).

It is an even further object of the present invention to use and XML schema known as EPUB (electronic publication, open e-book format).

It is an even further object of the present invention to use and XML schema known as Extensible Application Markup Language.

It is an even further object of the present invention to use and XML schema known as Extensible Data Format.

It is an even further object of the present invention to use and XML schema known as Extensible Messaging and Presence Protocol.

It is an even further object of the present invention to use and XML schema known as Extensible Provisioning Protocol.

It is an even further object of the present invention to use and XML schema known as Extensible Resource Identifier.

It is an even further object of the present invention to use and XML schema known as Extensible Stylesheet Language.

It is an even further object of the present invention to use and XML schema known as FDCML (Field Device Configuration Markup Language).

It is an even further object of the present invention to use and XML schema known as FicML (Fiction Markup Language).

It is an even further object of the present invention to use and XML schema known as FictionBook, which is an e-book format.

It is an even further object of the present invention to use and XML schema known as FieldML (Field Modelling/Markup Language).

It is an even further object of the present invention to use and XML schema known as FleXML, which is an XML transformation language.

It is an even further object of the present invention to use and XML schema known as FpML, which is a Financial Products Markup Language.

It is an even further object of the present invention to use and XML schema known as FreebXML.org, which is an initiative that aims to foster the development and adoption of ebXML and related technology through software and experience sharing.

It is an even further object of the present invention to use and XML schema known as FXT, which is a transformation specification for the Functional XML Transformation Tool.

It is an even further object of the present invention to use and XML schema known as Geography Markup Language, which is a grammar defined by the Open Geospatial Consortium (OGC) to express geographical features.

It is an even further object of the present invention to use and XML schema known as GJXDM, which is a data reference model for the exchange of data within the justice and public safety communities.

It is an even further object of the present invention to use and XML schema known as GPX, which is a language designed for transferring GPS data between software applications.

It is an even further object of the present invention to use and XML schema known as GraphML, which is a standard exchange format for graphs.

It is an even further object of the present invention to use and XML schema known as GuideML.

It is an even further object of the present invention to use and XML schema known as GXA, which is an extension of SOAP being worked on by Microsoft, IBM and some other developers.

It is an even further object of the present invention to use and XML schema known as GXL, which is a standard exchange format for graphs.

It is an even further object of the present invention to use and XML schema known as Green Building XML, also known as "gbXML", which is a schema to facilitate the transfer of building properties stored in 3D building data models (BIM) to engineering analysis tools, especially energy and building performance analysis.

It is an even further object of the present invention to use and XML schema known as HelpML.

It is an even further object of the present invention to use and XML schema known as HumanML, which is used for describing contextual (emotional, social, pragmatic) data about instances of human communication.

It is an even further object of the present invention to use and XML schema known as data and Content Exchange.

It is an even further object of the present invention to use and XML schema known as Industry Foundation Classes, which is specifically the "ifcXML" format, defined by ISO 10303-28 ("STEP-XML"), having file extension ".ifcXML", which is suitable for interoperability with XML tools and exchanging partial building models.

It is an even further object of the present invention to use and XML schema known as Interactive Media Markup Language, also known as IMML, which is used to define 3D spaces in the VastPark 3D platform.

It is an even further object of the present invention to use and XML schema known as Java Speech Markup Language, which is a language for annotating text input to speech synthesizers.

It is an even further object of the present invention to use and XML schema known as Job Definition Format, which is a standard developed by the graphic arts industry to facilitate cross-vendor work-flow implementations.

It is an even further object of the present invention to use and XML schema known as Job Submission Description Language, which describes simple tasks to non-interactive computer execution systems.

It is an even further object of the present invention to use and XML schema known as Keyhole Markup Language, which is used for geographic annotation.

It is an even further object of the present invention to use and XML schema known as LandXML, which is a non-proprietary standard for data exchange among the land development, civil engineering and surveying communities.

It is an even further object of the present invention to use and XML schema known as Lenex, which is an exchange format for swim rankings.

It is an even further object of the present invention to use and XML schema known as LGML, which is a Linguistics Markup Language, which is for describing natural languages.

It is an even further object of the present invention to use and XML schema known as Link Contract.

It is an even further object of the present invention to use and XML schema known as LOGML, also known as Log Markup Language, which is used for describing the log reports of web servers.

It is an even further object of the present invention to use and XML schema known as Mail Markup Language (MML), which is a language describing and structuring content for email.

It is an even further object of the present invention to use and XML schema known as MathML, which is a language describing mathematical notation.

It is an even further object of the present invention to use and XML schema known as Medical Markup Language.

It is an even further object of the present invention to use and XML schema known as Medical Reality Markup Language (MRML).

It is an even further object of the present invention to use and XML schema known as Microformats, which is a piece mark up that allows expression of semantics in an HTML (or XHTML) web page.

It is an even further object of the present invention to use and XML schema known as MOWL, which describes semantic interactions with multimedia content.

It is an even further object of the present invention to use and XML schema known as Music Encoding Initiative (MEI), which is an XML-based language for digital representations of music notation documents.

It is an even further object of the present invention to use and XML schema known as Music Markup Language.

It is an even further object of the present invention to use and XML schema known as MusicXML, which is an XML-based music notation file format.

It is an even further object of the present invention to use and XML schema known as MXML, which is a language used to declaratively lay-out the interface of applications, and also to implement complex business logic and rich Internet application behaviors.

It is an even further object of the present invention to use and XML schema known as Namespace Routing Language.

It is an even further object of the present invention to use and XML schema known as Namespace-based Validation Dispatching Language.

It is an even further object of the present invention to use and XML schema known as National data Exchange Model.

It is an even further object of the present invention to use and XML schema known as Nested Context Language.

It is an even further object of the present invention to use and XML schema known as NeXML, which is an XML representation of the NeXus data format.

It is an even further object of the present invention to use and XML schema known as NeuroML, which is a computational neuroscience model.

It is an even further object of the present invention to use and XML schema known as ODD, also known as 'One Document Does-it-all' TEI format for simultaneously recording project documentation and meta-schema definition from which a person can generate RELAX NG, W3C XML Schema, and DTDs as well as formatted documentation.

It is an even further object of the present invention to use and XML schema known as ODRL, which is an XML-based standard Rights Expression Language (REL) used in Digital Rights Management systems.

It is an even further object of the present invention to use and XML schema known as Office Open XML, which is a Microsoft file format specification for the storage of electronic documents.

It is an even further object of the present invention to use and XML schema known as OFX, also known as Open Financial Exchange, which is a unified specification for the electronic exchange of financial data between financial institutions, businesses and consumers via the Internet.

It is an even further object of the present invention to use and XML schema known as OIOXML, which is an XML-Markup Language created by the Danish government to ease communication from, to and between Danish governmental instances.

It is an even further object of the present invention to use and XML schema known as Open Mathematical Documents (OMDoc), based on OpenMath and MathML, but with a greater coverage.

It is an even further object of the present invention to use and XML schema known as OML, which is an XML format for outlines, based on OPML.

It is an even further object of the present invention to use and XML schema known as Open eBook, which is the e-book format defined by Open eBook Publication Structure Specification; superseded by ePub.

It is an even further object of the present invention to use and XML schema known as Open Scripture data Standard (OSIS), which is an XML-markup schema that defines tags for marking up Bibles, theological commentaries, and other related literature.

It is an even further object of the present invention to use and XML schema known as OpenDocument, which is a document file format used for describing electronic documents.

It is an even further object of the present invention to use and XML schema known as OpenMath, which is a Markup Language for mathematical formulas which can complement MathML.

It is an even further object of the present invention to use and XML schema known as OPML, which is an XML format for outlines.

It is an even further object of the present invention to use and XML schema known as phyloXML, which is an XML for phylogenetic and phylogenomic applications.

It is an even further object of the present invention to use and XML schema known as PMML, which an XML Markup Language for predictive analytics and data mining.

It is an even further object of the present invention to use and XML schema known as PNML, which is also known as Petri Net Markup Language.

It is an even further object of the present invention to use and XML schema known as PDBML, which is an XML Markup Language for Protein Data Bank.

It is an even further object of the present invention to use and XML schema known as RaiIML, which is a Markup Language for interoperability in railway industry applications.

It is an even further object of the present invention to use and XML schema known as RAML, which is a vocabulary for describing relational algebra expressions.

It is an even further object of the present invention to use and XML schema known as RDFa.

It is an even further object of the present invention to use and XML schema known as RecipeML.

It is an even further object of the present invention to use and XML schema known as Regular Language.

It is an even further object of the present invention to use and XML schema known as RELAX NG.

It is an even further object of the present invention to use and XML schema known as Remote Telescope Markup Language.

It is an even further object of the present invention to use and XML schema known as Resource Description Framework (RDF), which is a meta-data model based upon the idea of making statements about resources.

It is an even further object of the present invention to use and XML schema known as RoadXML, which is a file format for driving simulator databases.

It is an even further object of the present invention to use and XML schema known as RSS.

It is an even further object of the present invention to use and XML schema known as RSS enclosure.

It is an even further object of the present invention to use and XML schema known as S5 file format, which describes slide-show data.

It is an even further object of the present invention to use and XML schema known as SAML, which is used for authentication and authorization data.

It is an even further object of the present invention to use and XML schema known as SBML, which can be used to describe models of biological processes.

It is an even further object of the present invention to use and XML schema known as Scalable Vector Graphics, which describes two-dimensional vector graphics.

It is an even further object of the present invention to use and XML schema known as Schematron, which is an XML structure validation language for making assertions about the presence or absence of patterns in trees.

It is an even further object of the present invention to use and XML schema known as SCORM, which is a Markup Language for web-based e-learning.

It is an even further object of the present invention to use and XML schema known as SCXML, which provides a generic state-machine based execution environment based on Harel state-charts It is an even further object of the present invention to use and XML schema known as Shopinfo.xml, which is used to provide shop and product data.

It is an even further object of the present invention to use and XML schema known as Simple Sharing Extensions.

It is an even further object of the present invention to use and XML schema known as SOAP, which is a protocol for exchanging XML-based messages over computer networks.

It is an even further object of the present invention to use and XML schema known as SOAP with Attachments, which describes the method of using Web Services to send and receive files using a combination of SOAP and MIME, primarily over HTTP.

It is an even further object of the present invention to use and XML schema known as Speech Application Language Tags.

It is an even further object of the present invention to use and XML schema known as Speech.

It is an even further object of the present invention to use and XML schema known as Synthesis Markup Language, which is a Markup Language for speech synthesis applications.

It is an even further object of the present invention to use and XML schema known as SPML, which provides a user, resource and service provisioning data.

It is an even further object of the present invention to use and XML schema known as StratML, which is an XML vocabulary and schema for strategic plans.

It is an even further object of the present invention to use and XML schema known as Streaming Transformations for XML, which is a XML transformation language intended as a high-speed, low memory consumption alternative to XSLT.

It is an even further object of the present invention to use and XML schema known as SXBL, which defines the presentation and interactive behavior of elements described in SVG.

It is an even further object of the present invention to use and XML schema known as Synchronized Multimedia Integration Language, which describes multimedia presentations.

It is an even further object of the present invention to use and XML schema known as Text Encoding Initiative, which describes guidelines for text encoding, with schemas and a mechanism to customize to individual project needs.

It is an even further object of the present invention to use and XML schema known as ThML, also known as Theological Markup Language, created by Christian Classics Ethereal Library (CCEL), to create electronic theological texts.

It is an even further object of the present invention to use and XML schema known as Topicmaps.

It is an even further object of the present invention to use and XML schema known as TransducerML, which is an Open Geospatial Consortium language for describing sensors and their output.

It is an even further object of the present invention to use and XML schema known as Translation Memory eXchange (TMX), which is describes translation memory data.

It is an even further object of the present invention to use and XML schema known as TREX, which is a simple schema language.

It is an even further object of the present invention to use and XML schema known as Twitter Markup Language (TML), which is a subset of RTML.

It is an even further object of the present invention to use and XML schema known as Universal Description Discovery and Integration (UDDI), which describes a registry for businesses worldwide to list themselves on the Internet.

It is an even further object of the present invention to use and XML schema known as Vector Markup Language, which is used to produce vector graphics, implemented in Microsoft Office 2000 and higher.

It is an even further object of the present invention to use and XML schema known as it is an even further object of the present invention to use and XML schema known as Vexi, which is an easy-to-use platform for the development and delivery of Internet application interfaces.

It is an even further object of the present invention to use and XML schema known as Video Ad Serving Template VAST, which is an IAB sponsored language for use in delivery of inline/linear and non-linear video advertising online.

It is an even further object of the present invention to use and XML schema known as VoiceXML, which describes a format for specifying interactive voice dialogues between a human and a computer.

It is an even further object of the present invention to use and XML schema known as W3C MMI.

It is an even further object of the present invention to use and XML schema known as WDDX, also known as Web Distributed Data eXchange.

It is an even further object of the present invention to use and XML schema known as Web Feed.

It is an even further object of the present invention to use and XML schema known as Web Ontology Language, which is a Markup Language for defining and instantiating Web ontologies (a set of concepts within a domain and the relationships between those concepts).

It is an even further object of the present invention to use and XML schema known as Web Services Flow Language, which is an XML language proposed by IBM to describe the composition of Web services, later superseded by BPEL.

It is an even further object of the present invention to use and XML schema known as Web Services Description Language, which is an XML-based language that provides a model for describing Web services.

It is an even further object of the present invention to use and XML schema known as Web Services Dynamic Discovery, which is a technical specification that defines a multicast discovery protocol to locate services on a local network.

It is an even further object of the present invention to use and XML schema known as Wellsite data Transfer Standard Markup Language.

It is an even further object of the present invention to use and XML schema known as WML, also known as Wireless Markup Language.

It is an even further object of the present invention to use and XML schema known as WiX, also known as Windows Installers Data.

It is an even further object of the present invention to use and XML schema known as WordprocessingML, which is a file format specification for the storage of electronic documents.

It is an even further object of the present invention to use and XML schema known as WS-Policy.

It is an even further object of the present invention to use and XML schema known as X3D, also known as Extensible 3D, which is an international standard for real-time 3D computer graphics, the successor to Virtual Reality Modeling Language (VRML).

It is an even further object of the present invention to use and XML schema known as XAML, which is a declarative XML-based vector graphics Markup Language.

It is an even further object of the present invention to use and XML schema known as XACML, also known as eXtensible Access Control Markup Language.

It is an even further object of the present invention to use and XML schema known as XAP, also known as, Antenna Patterns.

It is an even further object of the present invention to use and XML schema known as XBEL, which is also known as XML Bookmark Exchange Language.

It is an even further object of the present invention to use and XML schema known as XBL, which is used to declare the behavior and look of 'XUL'-widgets and XML elements.

It is an even further object of the present invention to use and XML schema known as XBRL, which is an open data standard for financial reporting.

It is an even further object of the present invention to use and XML schema known as xCBL, which is a collection of XML specifications for use in e-business.

It is an even further object of the present invention to use and XML schema known as xCal, which is the XML-compliant representation of the iCalendar standard.

It is an even further object of the present invention to use and XML schema known as XCES, which is an XML based standard to codify text corpus.

It is an even further object of the present invention to use and XML schema known as XDI, which is used for sharing, linking, and synchronizing data using machine-readable structured documents that use an RDF vocabulary based on XRI structured identifiers.

It is an even further object of the present invention to use and XML schema known as Xduce, which is an XML transformation language.

It is an even further object of the present invention to use and XML schema known as XDXF, which is used for monolingual and bilingual dictionaries.

It is an even further object of the present invention to use and XML schema known as XFA, which enhances the processing of web forms.

It is an even further object of the present invention to use and XML schema known as Xforms, which is a format for the specification of a data processing model for XML data and user interface(s) for the XML data, such as web forms.

It is an even further object of the present invention to use and XML schema known as XFT, which is a XML language used in travel industry.

It is an even further object of the present invention to use and XML schema known as XHTML, which is a Markup Language that has the same depth of expression as HTML, but with a syntax conforming to XML.

It is an even further object of the present invention to use and XML schema known as XHTML Basic.

It is an even further object of the present invention to use and XML schema known as XHTML Friends Network.

It is an even further object of the present invention to use and XML schema known as XHTML Modularization.

It is an even further object of the present invention to use and XML schema known as XidML, which is an open standard used within the flight test instrumentation industry that describes instrumentation and how data is acquired, stored, transmitted and processed.

It is an even further object of the present invention to use and XML schema known as Xinclude, which describes a processing model and syntax for general purpose XML inclusion.

It is an even further object of the present invention to use and XML schema known as XLIFF, which is a XML Localization Interchange File Format, a format created to standardize localization.

It is an even further object of the present invention to use and XML schema known as Xlink, which is a language used for creating hyperlinks in XML documents.

It is an even further object of the present invention to use and XML schema known as XMI, which is an OMG standard for exchanging meta-data data via XML, which is the most common use of XMI is as an interchange format for UML models.

It is an even further object of the present invention to use and XML schema known as XML Encryption, which is a specification that defines how to encrypt the content of an XML element.

It is an even further object of the present invention to use and XML schema known as XML data Set, which describes an abstract data model of an XML document in terms of a set of data items.

It is an even further object of the present invention to use and XML schema known as XML Interface for Network Services, which is the definition and implementation of Internet applications, enforcing a specification-oriented approach.

It is an even further object of the present invention to use and XML schema known as XML Resource, which provides a platform independent way of describing windows in a GUI.

It is an even further object of the present invention to use and XML schema known as XML Schema, which is a description of a type of XML document, typically expressed in terms of constraints on the structure and content of documents of that type, above and beyond the basic syntax constraints imposed by XML itself.

It is an even further object of the present invention to use and XML schema known as XML Script, which is a XML transformation language, or a Microsoft technology preview for scripting web browsers.

It is an even further object of the present invention to use and XML schema known as XML Signature, which is an XML syntax for digital signatures.

It is an even further object of the present invention to use and XML schema known as XML for Analysis, which is used to provide data access in analytical systems, such as OLAP and Data Mining.

It is an even further object of the present invention to use and XML schema known as XML pipeline: a language expressing how XML transformations are connected together.

It is an even further object of the present invention to use and XML schema known as XML-RPC, which is a remote procedure call protocol which uses XML to encode its calls and HTTP as a transport mechanism.

It is an even further object of the present invention to use and XML schema known as XMLmosaic, which is a programming language contained in XML code. The XML describes relationships between classes and contains the procedures.

It is an even further object of the present invention to use and XML schema known as XMLTerm, which is a Mozilla-based Semantic User Interface.

It is an even further object of the present invention to use and XML schema known as XMLTV, which is a format to represent TV listings.

It is an even further object of the present invention to use and XML schema known as XMLVM, which is a format used to convert java .class files and .NET .exe files into other languages such as JavaScript or Objective-C.

It is an even further object of the present invention to use and XML schema known as XOMGL, which is used to obtain large amounts of data from municipal government agencies.

It is an even further object of the present invention to use and XML schema known as XOXO, which is an XML microformat for publishing outlines, lists, and blogrolls on the Web.

It is an even further object of the present invention to use and XML schema known as XPDL, also known as Interchange Business Process, which describes definitions between different workflow products.

It is an even further object of the present invention to use and XML schema known as XPath (or XPath 1.0).

It is an even further object of the present invention to use and XML schema known as XPath 2.0, which is a language for addressing portions of XML documents, successor of XPath 1.0.

It is an even further object of the present invention to use and XML schema known as Xpointer, which is a language used for addressing components of XML based Internet media.

It is an even further object of the present invention to use and XML schema known as Xproc, which is a W3C standard language to describe XML Pipeline.

It is an even further object of the present invention to use and XML schema known as Xquery, which is a query language designed to query collections of XML data (similar to SQL).

It is an even further object of the present invention to use and XML schema known as XrML, also known as the eXtensible Rights Markup Language, or the Rights Expression Language (REL) for MPEG-21.

It is an even further object of the present invention to use and XML schema known as Xrules, which is a rules language that expresses constraints, calculations, inter-dependencies, and properties that describe and exist among elements and attributes of an XML document.

It is an even further object of the present invention to use and XML schema known as XSIL, which is an XML-based transport language for scientific data.

It is an even further object of the present invention to use and XML schema known as XSL Formatting Objects, which is a Markup Language for XML document formatting which is most often used to generate PDFs.

It is an even further object of the present invention to use and XML schema known as XSL Transformations, which is a language used for the transformation of XML documents.

It is an even further object of the present invention to use and XML schema known as XSPF, which describes a play-list format for digital media.

It is an even further object of the present invention to use and XML schema known as XUL, which is a XML user interface Markup Language developed by the Mozilla project.

It is an even further object of the present invention to use and XML schema known as Xupdate, which is a lightweight query language for modifying XML data.

It is an even further object of the present invention to use a proprietary XML schema.

It is an even further object of the present invention to use the technology known as the Semantic Web.

It is an even further object of the present invention to use a technology known as HTML 5.0.

It is an even further object of the present invention to provide an application for a text-based interface that uses a proprietary Markup Language schema, to structure the content of the text message body to ask and receive answers to a wide variety of questions.

It is an even further object of the present invention to provide an application for a text-based interface that uses a proprietary Markup Language schema, to structure the content of the text message body to ask and receive a telephone number.

It is an even further object of the present invention to provide an application for a text-based interface that uses a proprietary Markup Language schema, to structure the content of the text message body to receive a wide variety of news related headlines.

It is an even further object of the present invention to provide an application for a text-based interface that uses a proprietary Markup Language schema, to structure the content of the text message body to transmit and receive data to access toll roads without the use of a toll tag.

It is an even further object of the present invention to provide an application for a text-based interface that uses a proprietary Markup Language schema, to structure the content of the text message body to transmit and receive data for converting currency.

It is an even further object of the present invention to provide an application for a text-based interface that uses a proprietary Markup Language schema, to structure the content of the text message body to transmit and receive data obtained by barcode scan or machine vision technology and the correct price including tax is returned to a user in order to help them keep a budget.

It is an even further object of the present invention to provide an application for a text-based interface that uses a proprietary Markup Language schema, to structure the content of the text message body to transmit and receive data obtained by barcode scan or machine vision technology to keep track of the total cost of items in a shopping cart.

It is an even further object of the present invention to provide an application for a text-based interface that uses a proprietary Markup Language schema, to structure the content of the text message body to transmit and receive data obtained by barcode scan or machine vision technology that provides an ingredients list of what's in food to avoid certain chemicals, ingredients, etc.

It is an even further object of the present invention to provide an application for a text-based interface that uses a proprietary Markup Language schema, to structure the content of the text message body to transmit and receive data obtained by barcode scan or machine vision technology about how calories, and various nutritional data concerning a food item.

It is an even further object of the present invention to provide an application for a text-based interface that uses a proprietary Markup Language schema, to structure the content of the text message body to transmit and receive data related to a song that is playing in order to purchase song download or ticket to a related event.

It is an even further object of the present invention to provide an application for a text-based interface that uses a proprietary Markup Language schema, to structure the content of the text message body to transmit and receive data about a person's medical history/allergies.

It is an even further object of the present invention to provide an application for a text-based interface that uses a proprietary Markup Language schema, to structure the content of the text message body to transmit and receive data obtained by barcode scan or machine vision technology to determine if another store has the same item for less.

It is an even further object of the present invention to provide an application for a text-based interface that uses a proprietary Markup Language schema, to structure the content of the text message body to transmit and receive data obtained by barcode scan or machine vision technology about what is a clothing item made of, and cleaning instructions.

It is an even further object of the present invention to provide an application for a text-based interface that uses a proprietary Markup Language schema, to structure the content of the text message body to transmit and receive data obtained by barcode scan or machine vision technology which provides a list of ingredients in a particular store based on a recipe that as been input via the present inventions structured and/or tagged text message body.

It is an even further object of the present invention to provide an application for a text-based interface that uses a proprietary Markup Language schema, to structure the content of the text message body to transmit and receive data obtained by barcode scan or machine vision technology for age appropriate data, and reviews.

It is an even further object of the present invention to provide an application for a text-based interface that uses a proprietary Markup Language schema, to structure the content of the text message body to transmit and receive data related to how to run gadgets in a car, how to change a tire, etc.

It is an even further object of the present invention to provide an application for a text-based interface that uses a proprietary Markup Language schema, to structure the content of the text message body to transmit and receive data obtained by barcode scan or machine vision technology of receipts to keep track of items for income tax purpose, or for store returns, warranty, etc.

It is an even further object of the present invention to provide an application for a text-based interface that uses a proprietary Markup Language schema, to structure the content of the text message body to transmit and receive data related to insurance, including hospital, dental, proof of automobile coverage cards, etc.

It is an even further object of the present invention to provide an application for a text-based interface that uses a proprietary Markup Language schema, to structure the content of the text message body to transmit and receive data obtained by barcode scan or machine vision technology related to Hazardous Chemicals, MSDS, etc.

It is an even further object of the present invention to provide an application for a text-based interface that uses a proprietary Markup Language schema, to structure the content of the text message body to transmit and receive data by barcode scan, or machine vision related to a plant, what it is, and how does a person take care of the plant, and what to do if a person has contacted a dangerous plant.

It is an even further object of the present invention to provide an application for a text-based interface that uses a proprietary Markup Language schema, to structure the content of the text message body to transmit and receive data obtained via barcode scan or machine vision technology in order to determine if a company at the scanned address is registered with the Better Business Bureau, or to provide a hyperlink to Angie's List, LinkedIn, Facebook, etc.

It is an even further object of the present invention to provide an application for a text-based interface that uses a proprietary Markup Language schema, to structure the content of the text message body to transmit and receive data related to a person's eyeglass, or contact lens prescription.

It is an even further object of the present invention to provide an application for a text-based interface that uses a proprietary Markup Language schema, to structure the content of the text message body to transmit and receive data related to the side effects of a medication, or supplement, and in addition to what are the side effects of combined medications and/or supplements are.

It is an even further object of the present invention to provide an application for a text-based interface that uses a proprietary Markup Language schema, to structure the content of the text message body to transmit and receive data to exchange demographic data, such as that contained in a business card.

It is an even further object of the present invention to provide an application for a text-based interface that uses a proprietary Markup Language schema, to structure the content of the text message body to transmit and receive data related to calendar data.

It is an even further object of the present invention to provide an application for a text-based interface that uses a proprietary Markup Language schema, to structure the content of the text message body to transmit and receive data obtained via barcode scan or machine vision technology as to what tools, materials, etc are required to build an item.

It is an even further object of the present invention to provide an application for a text-based interface that uses a proprietary Markup Language schema, to structure the content of the text message body to transmit and receive data about how much alcohol is contained in a bottle, or drink, and how much can be driven before in a period of time before becoming concerned about DUI.

It is an even further object of the present invention to provide an application for a text-based interface that uses a proprietary Markup Language schema, to structure the content of the text message body to transmit and receive data via a barcode scan or machine vision technology related to a Remote Control device functionality, and programming.

It is an even further object of the present invention to provide an application for a text-based interface that uses a proprietary Markup Language schema, to structure the content of the text message body to transmit and receive data.

It is an even further object of the present invention to provide an application for a text-based interface that uses a proprietary Markup Language schema, to structure the content of the text message body to transmit and receive data via a barcode scan or machine vision technology, related to a restaurant menu, in which barcodes, or machine vision codes, linked to a multilingual output regarding food calories, carbohydrate value, allergy potentials, organic certifications, kosher certifications, etc.

It is an even further object of the present invention to provide an application for a text-based interface that uses a proprietary Markup Language schema, to structure the content of the text message body to transmit and receive data obtained via barcode scan or machine vision technology in which any item can be checked for recall notice.

It is an even further object of the present invention to provide an application for a text-based interface that uses a proprietary Markup Language schema, to structure the content of the text message body to transmit and receive data via a barcode scan or machine vision technology related to a song, including data about the artist, price to download, ability to download, etc.

It is an even further object of the present invention to provide an application for a text-based interface that uses a proprietary Markup Language schema, to structure the content of the text message body to transmit and receive data via a barcode scan or machine vision technology related to blood glucose, and/or blood cholesterol data.

It is an even further object of the present invention to provide an application for a text-based interface that uses a proprietary Markup Language schema, to structure the content of the text message body to transmit and receive data obtained via a barcode scan or machine vision technology for scanning an item for price, to which tax is added, and the data is available in a multilingual output option.

It is an even further object of the present invention to provide an application for a text-based interface that uses a proprietary Markup Language schema, to structure the content of the text message body to transmit and receive data via barcode scan or machine vision technology related to a book related to the author, ability to purchase or download, and the availability in a particular language.

It is an even further object of the present invention to provide an application for a text-based interface that uses a proprietary Markup Language schema, to structure the content of the text message body to transmit and receive data via a barcode scan or machine vision technology to convert a recipe to a different language, and also where can the ingredients be purchased locally.

It is an even further object of the present invention to provide an application for a text-based interface that uses a proprietary Markup Language schema, to structure the content of the text message body to transmit and receive data a barcode scan or machine vision technology related to currency to determine an exchange rate, and to see if a particular bill's serial number is valid.

It is an even further object of the present invention to provide an application for a text-based interface that uses a proprietary Markup Language schema, to structure the content of the text message body to transmit and receive data obtained via barcode scan or machine vision technology related to an item's safety rating, efficiency, seal or approval, etc.

It is an even further object of the present invention to provide an application for a text-based interface that uses a proprietary Markup Language schema, to structure the content of the text message body to transmit and receive data obtained via barcode scan, or machine vision technology related to museum data, including data on paintings, statues, etc.

It is an even further object of the present invention to provide an application for a text-based interface that uses a proprietary Markup Language schema, to structure the content of the text message body to transmit and receive data based on location, in which a list that has been generated is consulted, and the user is alerted they are in the vicinity of one of the items, or task on their list.

SUMMARY OF THE INVENTION

The present invention relates to the use of various, widely used unstructured and untagged text message protocols to form a new type of text message body that can be used to transmit and receive over wired and/or wireless communication systems semi-structured, or structured text message bodies, which optionally may also use various, widely used Markup Languages. The semi-structure, or structure used within the text message body can be a format, such as, but not limited to, RFID, EDI, barcodes, partitions, etc. The tagging for use with the text message body can be a protocol, such as, but not limited to, Extensible Markup Language (XML).

DETAILED DESCRIPTION OF THE PREFERRED EMBODIMENTS

The present invention relates to the use of various, widely used unstructured and untagged text message protocols to form a new type of text message body that can be used to transmit and receive over wired and/or wireless communication systems semi-structured, or structured text message bodies, which optionally may also use various, widely used Markup Languages. The semi-structure, or structure used within the text message body can be a format, such as, but not limited to, RFID, EDI, barcodes, partitions, etc. The tagging for use with the text message body can be a protocol, such as, but not limited to, Extensible Markup Language (XML).

There are a wide variety of embodiments covered by a person's invention that will be obvious to those skilled in the art. A few of the various illustrative embodiments that include some of the features described previously in the "Features And Objects Of The Present Invention" are described below.

Cellphones are used by billions of people worldwide. Modern cellphones are part computer and part radio. They provide an incredible array of functions, including, but not limited to, creating and storing contact data, creating and storing task or to-do lists, creating and storing appointments and reminders, using calculators to do math, send and receive e-mail or text messages, get data, play games, watch TV, etc.

The novelty of the cellular system is the division of a city, or an area into small cells, a person's allows extensive frequency reuse, so millions of people can use cellphones simultaneously.

Cellphones are full-duplex devices, which means one frequency is used for talking and a second, separate frequency is used for listening. Basically, both people on the call can talk at once. The transmissions of a base station and the phones within its cell do not make it very far outside a particular cell, which means cells can reuse the same frequencies within a city, or area The cellular approach requires a large number of base stations in a city of any particular size. A typical large city can have hundreds, or thousands of cell towers. Each carrier in each city also runs one central office called the Mobile Telephone Switching Office (MTSO). a person's office handles all of the phone connections to the normal land-based phone system, and controls all of the base stations in the region.

All cellphones have special codes associated with them. These codes are used to identify the phone, the phone's owner and the service provider:
1) Electronic Serial Number (ESN)—a unique 32-bit number programmed into the phone when it is manufactured
2) Mobile Identification Number (MIN)—a 10-digit number derived from a person's phone's number
3) System Identification Code (SID)—a unique 5-digit number that is assigned to each carrier by the FCC As an example, if a person has their cellphone turned on, and someone initiates a call to that particular cellphone, here's what happens during the call:
1) When a person first power up the phone, it listens for an SID on the control channel. The control channel is a special frequency that the phone and base station use to talk to one another about things like call set-up and channel changing. If the phone cannot find any control channels to listen to, it knows it is out of range and displays a "no service" message.
2) When it receives the SID, the phone compares it to the SID programmed into the phone. If the SIDs match, the phone knows that the cell it is communicating with is part of its home system.
3) Along with the SID, the phone also transmits a registration request, and the MTSO keeps track of a person's phone's location in a database—a person's way, the MTSO knows which cell a person are in when it wants to ring a person's phone.
4) The MTSO gets the call, and it tries to find you. It looks in its database to see which cell a person are in.
5) The MTSO picks a frequency pair that a person's phone will use in that cell to take the call.
6) The MTSO communicates with a person's phone over the control channel to tell it which frequencies to use, and once a person's phone and the tower switch on those frequencies, the call is connected. Now, a person are talking by two-way radio to a friend.
7) As a person moves toward the edge of a person's cell, a person's cell's base station notes that a person's signal strength is diminishing. Meanwhile, the base station in the cell a person are moving toward (which is listening and measuring signal strength on all frequencies, not just its own one-seventh) sees a person's phone's signal strength increasing. The two base stations coordinate with each other through the MTSO, and at some point, a person's phone gets a signal on a control channel telling it to change frequencies. The network hand off switches a person's phone to the new cell.

A typical cellphone includes the following parts:
1) A circuit board containing the brains of the phone
2) An antenna
3) A liquid crystal display (LCD)
4) A keyboard (not unlike the one a person find in a TV remote control)
5) A microphone
6) A speaker
7) A battery The circuit board is the heart of the system. The analog-to-digital and digital-to-analog conversion chips translate the outgoing audio signal from analog to digital and the incoming signal from digital back to analog, a person can learn more about A-to-D and D-to-A conversion and its importance to digital audio in How Compact Discs Work. The digital signal processor (DSP) is a highly customized processor designed to perform signal-manipulation calculations at high speed.

The microprocessor handles all of the housekeeping chores for the keyboard and display, deals with command and control signaling with the base station and also coordinates the rest of the functions on the board.

The ROM and Flash memory chips provide storage for the phone's operating system and customizable features, such as the phone directory. The radio frequency (RF) and power section handles power management and recharging, and also deals with the hundreds of FM channels. Finally, the RF amplifiers handle signals traveling to and from the antenna.

The display has grown considerably in size as the number of features in cellphones have increased. Most current phones offer built-in phone directories, calculators and games. And many of the phones incorporate some type of PDA or Web browser.

A recent advancement in cellphone technology is pic-cells and femto-cells. Typically the range of a pico-cell is 200 meters or less, and a femto-cell is on the order of 10 meters.

A pico-cell is a small cellular base-station typically covering a small area, such as in-building including, but not limited to, offices, shopping malls, train stations, stock exchanges, etc., or more recently in aircraft. In cellular networks, pico-cells are typically used to extend coverage to indoor areas where outdoor signals do not reach well, or to add network capacity in areas with very dense phone usage, such as train stations, pico-cells provide coverage and capacity in areas difficult or expensive to reach using the more traditional macro-cell approach.

In cellular wireless networks, such as GSM, the pico-cell base station is typically a low cost, small, reasonably simple, and connects to a Base Station Controller (BSC). Multiple pico-cell 'heads' connect to each BSC: the BSC performs radio resource management and hand-over functions, and aggregates data to be passed to the Mobile Switching Center (MSC) and/or the Gateway GPRS Support Node (GGSN).

More recent work has developed the concept towards a head unit containing not only a pico-cell, but also many of the functions of the BSC and some of the MSC. This form of pico-cell is sometimes called an access point base station or 'enterprise femto-cell'. In this case, the unit contains all the capability required to connect directly to the Internet, without the need for the BSC/MSC infrastructure. This is potentially a more cost effective approach.

Pico-cells offer many of the benefits of "small cells", similar to femto-cells, in that they improve data throughput for mobile users and increase capacity in the mobile network. In particular, the integration of pico-cells with macro-cells through a Heterogeneous Network can be useful in seamless hand-offs and increased mobile data capacity.

Pico-cells are available for most cellular technologies including GSM, CDMA, UMTS and LTE from various manufacturers.

A femto-cell is a small cellular base station, typically designed for use in a home or small business. It connects to the service provider's network via broadband, such as, but not limited to, DSL or cable. Current designs typically support 2 to 4 active mobile phones in a residential setting, and 8 to 16 active mobile phones in enterprise settings. A femto-cell allows service providers to extend service coverage indoors, especially where access would otherwise be limited or unavailable. Although much attention is focused on WCDMA, the concept is applicable to all standards, including GSM, CDMA2000, TD-SCDMA, WiMAX and LTE solutions.

Femto-cells are an alternative way to deliver the benefits of fixed-mobile convergence (FMC). The distinction is that most FMC architectures require a new (dual-mode) handset which works with existing unlicensed spectrum home/enterprise wireless access points, while a femto-cell-based deployment will work with existing handsets but requires installation of a new access point that uses licensed spectrum.

Femto-cells are typically sold by a Mobile Network Operator (MNO) to its residential or enterprise customers. A femto-cell is typically the size of a residential gateway or smaller, and connects to the user's broadband line. Integrated femto-cells (which include both a DSL router and femto-cell) also exist. Once plugged in, the femto-cell connects to the MNO's mobile network, and provides extra coverage. From a user's perspective, it is plug and play, there is no specific installation or technical knowledge required—anyone can install a femto-cell at home.

In most cases the user must then declare which mobile phone numbers are allowed to connect to their femto-cell, usually via a web interface provided by the MNO. This only needs to be done once. When these mobile phones arrive under coverage of the femto-cell, they switch over from the macro-cell to the femto-cell automatically. Most MNOs provide a way for the user to know the person has happened, for example by having a different network name appear on the mobile phone. All communications will then automatically go through the femto-cell. When the user leaves the femto-cell coverage, whether or not in a call area, a person's phone hands over seamlessly to the macro network, femto-cells require specific hardware, so existing WiFi or DSL routers cannot be upgraded to a femto-cell.

Once installed in a specific location, most femto-cells have protection mechanisms so that a location change will be reported to the MNO. Whether the MNO allows femto-cells to operate in a different location depends on the MNO's policy. International location change of a femto-cell is not permitted because the femto-cell transmits licensed frequencies which belong to different network operators in different countries.

Various standards bodies have published formal specifications for femto-cells for the most popular technologies, namely WCDMA, CDMA2000, LTE and WiMAX. These all broadly conform to an architecture with three major elements:

1) The femto-cell access points themselves, which embody greater network functionality than found in macro-cell base-stations, such as the radio resource control functions, a person's allows much greater autonomy within the femto-cell, enabling self-configuration and self-optimization, femto-cells are connected using broadband IP, such as DSL or cable modems, to the network operator's core switching centers.
2) The femto-cell gateway, comprising a security gateway that terminates large numbers of encrypted IP data connections from hundreds of thousands of femto-cells, and a signaling gateway which aggregates and validates the signaling traffic, authenticates each femto-cell and interfaces with the mobile network core switches using standard protocols.
3) The management and operational system which allows software updates and diagnostic checks to be administered. These typically use the same TR.069 management protocol published by the Broadband Forum and also used for administration of residential modems.

The key interface in these architectures is that between the femto-cell access points and the femto-cell gateway.

Another key element of the present invention are text messages, also known as Short Message Service (SMS). Short Message Service (SMS) is the term used for short (up to 160 characters in the text message body depending on encoding) messages that are sent between mobile phones. Typically, it works like this:

4) A person sends a Short Message from their phone to a friend's phone.
5) The message goes to a Message Center.
6) If your friend is available—meaning, their phone is turned on, and they are in a cellphone service area, the Message Center sends the message to their phone.
7) If they are not available, the Message Center holds onto the message.
8) When your friend becomes available, their phone requests the messages, which are then delivered.

SMS stands for Short Message Service. Simply put, it is a method of communication that sends text between cellphones, or from a PC or handhold to a cellphone. The "short" part refers to the maximum size of the text messages: 160 characters (letters, numbers or symbols in the Latin alphabet). For other alphabets, such as Chinese, the maximum SMS size is 70 characters.

Even if a person is not talking on their cellphone, their phone is constantly sending and receiving information. It is talking to a cellphone tower over a pathway called a control channel. The reason for this chatter is so that the cellphone system knows which cell your phone is in, and so that your phone can change cells as you move around. Every so often, your phone and the tower will exchange a packet of data that lets both of them know that everything is operating correctly.

A person's cellphone also uses the control channel for call setup. When someone tries to call you, the tower sends your phone a message over the control channel that tells your phone to play its ring-tone. The tower also gives your phone a pair of voice channel frequencies to use for the call.

The control channel also provides the pathway for SMS messages. When someone sends you an SMS message, the message flows through the SMSC, then to the tower, and the tower sends the message to your phone as a little packet of data on the control channel. In the same way, when you send a message, your phone sends it to the tower on the control channel and it goes from the tower to the SMSC and from there to its destination.

The primary components of an SMS system include:

The SMSC (Short Message Service Center) is the entity which does the job of storing and forwarding messages to and from the mobile station. The SME (Short Message Entity), which is typically a mobile phone or a capable modem, can be located in the fixed network or a mobile station, receives and sends short messages.

The SMS GMSC (SMS gateway MSC) is a gateway MSC that can also receive short messages. The gateway MSC is a mobile network's point of contact with other networks. On receiving the short message from the short message center, GMSC uses the SS7 network to interrogate the current position of the mobile station form the HLR, the home location register.

The HLR is the main database in a mobile network. It holds information of the subscription profile of the mobile and also about the routing information for the subscriber, i.e. the area (covered by a MSC) where the mobile is currently situated. The GMSC is thus able to pass on the message to the correct MSC.

The MSC (Mobile Switching Center) is the entity in the network which does the job of switching connections between mobile stations or between mobile stations and the fixed network.

The VLR (Visitor Location Register) corresponds to each MSC and contains temporary information about the mobile, information like mobile identification and the cell (or a group of cells) where the mobile is currently situated. Using information form the VLR the MSC is able to switch the information (short message) to the corresponding BSS (Base Station System, BSC+BTSs), which transmits the short message to the mobile. The BSS consists of transceivers, which send and receive information over the air interface, to and from the mobile station. This information is passed over the signaling channels so the mobile can receive messages even if a voice or data call is going on.

The actual data format for the text message includes things like the length of the message, a time stamp, the destination phone number, the format, etc.

In addition to person-to-person messages, SMS can be used to send a message to a large number of people at a time, either from a list of contacts or to all the users within a particular area. This service is called broadcasting and is used by companies to contact groups of employees or by online services to distribute news and other information to subscribers.

The SMS text message consists of a header, which contains meta-data, such as the destination for the message, and the unstructured, untagged text message body. The present invention takes advantage of the unstructured text message body, and adds structure using data partitions—similar to RFID and barcodes, and/or comma delimited values. Furthermore, the present invention can add meta-data within the unstructured, untagged text message body.

Again, the present invention takes advantage of the unstructured text message body, and adds structure using data partitions—similar to RFID and barcodes, and/or comma delimited values. Furthermore, the present invention can add meta-data within the unstructured text message body.

Embodiment 1 illustrates a flow chart of the primary embodiment of the present invention. In this configuration, cellphones are used instead of RFID transponders as a means to identify a vehicle to a toll road authority's database in order for a traveler to have their account debited for a toll charge.

A toll road (also tollway, turnpike, toll highway, or express toll route) is a privately or publicly built road for which a driver pays a toll (a fee) for use. Other civil structures for which tolls are charged include bridges and tunnels. A toll is typically due when a vehicle passes a tolling station, be it a manual barrier-controlled toll plaza or a free-flow multi-lane station.

Some toll authority's charge vehicles per total distance driven over a defined area.

Some toll roads charge a toll in only one direction, such as where the M4 in Great Britain crosses the River Severn on either of the two Severn Bridges. On these bridges, it is free to travel from Wales into England, but a toll must be paid in the reverse direction. Crossings between Pennsylvania and New Jersey operated by Delaware River Port Authority, and crossings between New Jersey and New York operated by Port Authority of New York and New Jersey, use this method (in coordination with the E-ZPass electronic transponder system) given the distance between the bridges along the river, area commuter traffic, and similar tolls on each bridge.

Toll payments may be made in cash, by credit card, by pre-paid card, or by an electronic toll collection system.

The present invention is most interest in an adaptation of military "identification friend or foe" or RFID technology, called electronic toll collection, which is used to lessen the delay incurred in toll collection. The electronic system determines whether a passing vehicle is enrolled in the program, and alerts enforcers if it is not. The accounts of registered cars are debited automatically without stopping or even opening a window. The first major deployment of an RFID electronic toll collection system in the United States was on the Dallas North Tollway in 1989 by Amtech. The Amtech RFID technology used on the Dallas North Tollway was originally developed at Sandia Labs for use in tagging and tracking livestock. In the same year, the Telepass active transponder RFID system was introduced across Italy.

Highway 407 in the province of Ontario, Canada has no toll booths, and instead reads a transponder mounted on the windshields of each vehicle using the road (the rear license plates of vehicles lacking a transponder are photographed when they enter and exit the highway). This made the highway the first all-automated highway in the world. A bill is mailed monthly for usage of the 407. Lower charges are levied on frequent 407 users who carry electronic transponders in their vehicles.

Throughout most of the East Coast of the United States, E-ZPass (operated under the brands I-Pass in Illinois, i-Zoom in Indiana, and Fast Lane in Massachusetts) is accepted on almost all toll roads. Similar systems include SunPass in Florida, FasTrak in California, and ExpressToll in Colorado. The systems use a small radio transponder mounted in or on a customer's vehicle to deduct toll fares from a pre-paid account as the vehicle passes through the toll barrier. This reduces manpower at toll booths and increases traffic flow and fuel efficiency by reducing the need for complete stops to pay tolls at these locations.

By designing a tollgate specifically for electronic collection, it is possible to carry out open-road tolling, where the customer does not need to slow at all when passing through the tollgate. The U.S. state of Texas is testing a system on a stretch of Texas 121 that has no toll booths. Drivers without a TollTag have their license plate photographed automatically and the registered owner will receive a monthly bill, at a higher rate than those vehicles with TollTags.

Another feature of many electronic toll collection systems is inter-agency interoperability, where the same transponder is accepted at many toll agencies. For instance, the E-ZPass tag is accepted at most toll facilities in the Eastern United States, from Virginia to Maine, west to the Peace Bridge spanning the Niagara River, and in Ohio, Indiana, and Illinois. The TxTAG system allows interoperability throughout the state of Texas, but is not compatible with systems used outside of Texas.

Electronic toll collection systems also have drawbacks. A computer glitch can result in delays several miles long. Some U.S. state turnpike commissions have debated implementing E-ZPass but have found that such a system would be ineffective because most of the people who use the turnpike are not commuters, are from states that have no ETS on turnpikes, or are from states that don't have a turnpike at all. The toll plazas of some turnpikes are antiquated because they were originally built for traffic that stops to pay the toll or get a ticket.

The present invention provides a novel system, method, and apparatus for electronic toll road collections. Instead of using a transponder, a driver's cellphone is used. Instead of a transponder interrogator, a cell tower in the form of a macro-cell, pico-cell, or femto-cell is used to transmit and receive wireless signals emanating from a cellphone that is switched on and operating.

As an example, if a person driving on a toll road has their cellphone turned on, and their cellphone electronic IDs are registered in the toll roads database, the following is what happens during a toll road authority transaction:

1) Prior to driving onto a toll road, a person will power up their cellphone, which listens for an SID on the control channel. The control channel is a special frequency that the phone and base station use to communicate to one another about things like call set-up and channel changing.
2) When it receives the SID, the phone compares it to the SID programmed into the phone. If the SIDs match, the phone knows that the cell it is communicating with is part of its home system.
3) Along with the SID, the cellphone also transmits a registration request, and the MTSO keeps track of a person's phone location in a database, in this way, the MTSO knows which cell a person is in.
4) The MTSO gets an automated call from a toll road authority toll booth, and the MTSO looks in its database to see which cell (toll booth) a person traveling on a toll road is in.
5) The MTSO picks and communicates a frequency that a person's cellphone will use in that cell to receive a text message from the toll road authority to the toll road application running on the person's cellphone.
6) The person traveling on the toll road, receives a text message from the toll road authority that includes various data, such as, but not limited to, the description of the toll both passed, the time and date, the amount of the toll, and how much money is left in their toll account. The text message body contains data that may be used by the person's cellphone toll road application in the form of a semi-structured, or structured message, which can be formatted such as, but not limited to data partitioning and/or comma delimited values, etc. In addition, the semi-structured, or structured message can employ tagging for additional functionality using a protocol, such as, but not limited to, Extensible Markup Language (XML) schema, such as, but not limited to It is an even further object of the present invention to use and XML schema known asdsML Markup Language, which is used for interchange of data between advertising systems; Agricultural Ontology Service; AIML Markup Language, which is used for creating artificial intelligence chatterbots; Attention Profiling Markup Language (APML), which is a format for capturing a person's interests and dislikes; Atom, which is a language used for web feeds; Automated Test Markup Language (ATML), which defines a standard exchange medium for sharing data between components of automatic test systems; Attention.xml; aecXML, which is a Markup Language which uses Industry Foundation Classes to create a vendor-neutral means to access data generated by Building data Modeling; Binary Format Description Language, which is an extension of XSIL which has added conditionals and the ability to reference files by their stream numbers, rather than by their public URLs; Business Process Execution Language, which is a business process modeling language that is executable; Basic Markup Language, which is an easy to use Markup Language; Call Control eXtensible Markup Language, which is a standard designed to provide telephony support to VoiceXML; CellML, which is a language describing mathematical models; Channel Definition Format; Chemical Markup Language; Clinical Data Interchange Standards Consortium; Clinical Document Architecture; CMRL, which is a Markup Language for concise message content; COLLADA, which is standard for exchanging digital assets among various graphics software applications; Common Alerting Protocol (CAP); CookSwing; CXML, which is a protocol intended for communication of business documents between procurement applications, e-commerce hubs and suppliers; Darwin data Typing Architecture; DiagML for Integrated Diagnostics and Health Management; dicML for monolingual and bilingual dictionaries; Digital Forensics XML; Dimensional Markup Language; Directory Service Markup Language; DisplayML; DocBook: a Markup Language for technical documentation; Document Schema Definition Language; Document Structure Description, which is a schema language for XML; DotML; ebXML, which is a collection of Electronic Business specifications; eLML, which is an eLesson Markup Language; EMML Enterprise Mashup Markup Language; ENML (eNotarization Markup Language); EPPML (Extensible Postal Product Model and Language); EPUB (electronic publication, open e-book format); Extensible Application Markup Language; Extensible Data Format; Extensible Messaging and Presence Protocol; Extensible Provisioning Protocol; Extensible Resource Identifier; Extensible Stylesheet Language; FDCML (Field Device Configuration Markup Language); FicML (Fiction Markup Language); FictionBook, which is an e-book format; FieldML (Field Modelling/Markup Language); FIeXML, which is an XML transformation language; FpML, which is a Financial Products Markup Language; FreebXML.org, which is an initiative that aims to foster the development and adoption of ebXML and related technology through software and experience sharing; FXT, which is a transformation specification for the Functional XML Transformation Tool; Geography Markup Language, which is a grammar defined by the Open Geospatial Consortium (OGC) to express geographical features; GJXDM, which is a data reference model for the exchange of data within the justice and public safety communities; GPX, which is a language designed for transferring GPS data between software applications; GraphML, which is a standard exchange format for graphs; GuideML; GXA, which is an extension of SOAP being worked on by Microsoft, IBM and some other developers; GXL, which is a standard exchange format for graphs; Green Building XML, also known as "gbXML", which is a schema to facilitate the transfer of building properties stored in 3D building data models (BIM) to engineering analysis tools, especially energy and building performance analysis; HelpML; HumanML, which is used for describing contextual (emotional, social, pragmatic) data about instances of human communication; data and Content Exchange; Industry Foundation Classes, which is specifically the "ifcXML" format, defined by ISO 10303-28 ("STEP-XML"), having file extension ".ifcXML", which is suitable for interoperability with XML tools and exchanging partial building models; Interactive Media Markup Language, also known as IMML, which is used to define 3D spaces in the VastPark 3D platform; Java Speech Markup Language, which is a language for annotating text input to speech synthesizers; Job Definition Format, which is a standard developed by the graphic arts industry to facilitate cross-vendor work-flow implementations; Job Submission Description Language, which describes simple tasks to non-interactive computer execution systems; Keyhole Markup Language, which is used for geographic annotation; LandXML, which is a non-proprietary standard for data exchange among the land development, civil engineering and surveying communities; Lenex, which is an exchange format for swim rankings; LGML, which is a Linguistics Markup Language, which is for describing natural languages; Link Contract; LOGML, also known as Log Markup Language, which is used for describing the log reports of web servers; Mail Markup Language (MML), which is a language describing and structuring content for email; MathML, which is a language describing mathematical notation; Medical Markup Language; Medical Reality Markup Language (MRML); Microformats, which is a piece mark up that allows expression of semantics in an HTML (or XHTML) web page; MOWL, which describes semantic interactions with multimedia content; Music Encoding Initiative (MEI), which is an XML-based language for digital representations of music notation documents; Music Markup Language; MusicXML, which is an XML-based music notation file format; MXML, which is a language used to declaratively lay-out the interface of applications, and also to implement complex business logic and rich Internet application behaviors; Namespace Routing Language; Namespace-based Validation Dispatching Language; National data Exchange Model; Nested Context Language; NeXML, which is an XML representation of the NeXus data format; NeuroML, which is a computational neuroscience model; ODD, also known as 'One Document Does-it-all' TEI format for simultaneously recording project documentation and meta-schema definition from which a person can generate RELAX NG, W3C XML Schema, and DTDs as well as formatted documentation; ODRL, which is an XML-based standard Rights Expression Language (REL) used in Digital Rights Management systems; Office Open XML, which is a Microsoft file format specification for the storage of electronic documents; OFX, also known as Open Financial Exchange, which is a unified specification for the electronic exchange of financial data between financial institutions, businesses and consumers via the Internet; OIOXML, which is an XML-Markup Language created by the Danish government to ease communication from, to and between Danish governmental instances; Open Mathematical Documents (OMDoc), based on OpenMath and MathML, but with a greater coverage; OML, which is an XML format for outlines, based on OPML; Open eBook, which is the e-book format defined by Open eBook Publication Structure Specification; superseded by ePub; Open Scripture data Standard (OSIS), which is an XML-markup schema that defines tags for marking up Bibles, theological commentaries, and other related literature; OpenDocument, which is a document file format used for describing electronic documents; OpenMath, which is a Markup Language for mathematical formulas which can complement MathML; OPML, which is an XML format for outlines; phyloXML, which is an XML for phylogenetic and phylogenomic applications; PMML, which an XML Markup Language for predictive analytics and data mining; PNML, which is also known as Petri Net Markup Language; PDBML, which is an XML Markup Language for Protein Data Bank; RailML, which is a Markup Language for interoperability in railway industry applications; RAML, which is a vocabulary for describing relational algebra expressions; RDFa; RecipeML; Regular Language; RELAX NG; Remote Telescope Markup Language; Resource Description Framework (RDF), which is a meta-data model based upon the idea of making statements about resources; RoadXML, which is a file format for driving simulator databases; RSS; RSS enclosure; S5 file format, which describes slide-show data; SAML, which is used for authentication and authorization data; SBML, which can be used to describe models of biological processes; Scalable Vector Graphics, which describes two-dimensional vector graphics; Schematron, which is an XML structure validation language for making assertions about the presence or absence of patterns in trees; SCORM, which is a Markup Language for web-based e-learning; SCXML, which provides a generic state-machine based execution environment based on Harel state-charts; Shopinfo.xml, which is used to provide shop and product data; Simple Sharing Extensions; SOAP, which is a protocol for exchanging XML-based messages over computer networks; SOAP with Attachments, which describes the method of using Web Services to send and receive files using a combination of SOAP and MIME, primarily over HTTP; Speech Application Language Tags; Speech; Synthesis Markup Language, which is a Markup Language for speech synthesis applications; SPML, which provides a user, resource and service provisioning data; StratML, which is an XML vocabulary and schema for strategic plans; Streaming Transformations for XML, which is a XML transformation language intended as a high-speed, low memory consumption alternative to XSLT; SXBL, which defines the presentation and interactive behavior of elements described in SVG; Synchronized Multimedia Integration Language, which describes multimedia presentations; Text Encoding Initiative, which describes guidelines for text encoding, with schemas and a mechanism to customize to individual project needs; ThML, also known as Theological Markup Language, created by Christian Classics Ethereal Library (CCEL), to create electronic theological texts; Topicmaps; TransducerML, which is an Open Geospatial Consortium language for describing sensors and their output; Translation Memory eXchange (TMX), which is describes translation memory data; TREX, which is a simple schema language; Twitter Markup Language (TML), which is a subset of RTML; Universal Description Discovery and Integration (UDDI), which describes a registry for businesses worldwide to list themselves on the Internet; Vector Markup Language, which is used to produce vector graphics, implemented in Microsoft Office 2000 and higher; Vexi, which is an easy-to-use platform for the development and delivery of Internet application interfaces; Video Ad Serving Template VAST, which is an IAB sponsored language for use in delivery of inline/linear and non-linear video advertising online; It is an even further object of the present invention to use and XML schema known as It is an even further object of the present invention to use and XML schema known as VoiceXML, which describes a format for specifying interactive voice dialogues between a human and a computer; W3C MMI; WDDX, also known as Web Distributed Data eXchange; Web Feed; Web Ontology Language, which is a Markup Language for defining and instantiating Web ontologies (a set of concepts within a domain and the relationships between those concepts); Web Services Flow Language, which is an XML language proposed by IBM to describe the composition of Web services, later superseded by BPEL; Web Services Description Language, which is an XML-based language that provides a model for describing Web services; Web Services Dynamic Discovery, which is a technical specification that defines a multicast discovery protocol to locate services on a local network; Wellsite data Transfer Standard Markup Language; WML, also known as Wireless Markup Language; WiX, also known as Windows Installers Data; WordprocessingML, which is a file format specification for the storage of electronic documents; WS-Policy; X3D, also known as Extensible 3D, which is an international standard for real-time 3D computer graphics, the successor to Virtual Reality Modeling Language (VRML); XAML, which is a declarative XML-based vector graphics Markup Language; XACML, also known as eXtensible Access Control Markup Language; XAP, also known as, Antenna Patterns; XBEL, which is also known as XML Bookmark Exchange Language; XBL, which is used to declare the behavior and look of 'XUL'-widgets and XML elements; XBRL, which is an open data standard for financial reporting; xCBL, which is a collection of XML specifications for use in e-business; xCal, which is the XML-compliant representation of the iCalendar standard; XCES, which is an XML based standard to codify text corpus; XDI, which is used for sharing, linking, and synchronizing data using machine-readable structured documents that use an RDF vocabulary based on XRI structured identifiers; Xduce, which is an XML transformation language; XDXF, which is used for monolingual and bilingual dictionaries; XFA, which enhances the processing of web forms; Xforms, which is a format for the specification of a data processing model for XML data and user interface(s) for the XML data, such as web forms; XFT, which is a XML language used in travel industry; XHTML, which is a Markup Language that has the same depth of expression as HTML, but with a syntax conforming to XML; XHTML Basic; XHTML Friends Network; XHTML Modularization; XidML, which is an open standard used within the flight test instrumentation industry that describes instrumentation and how data is acquired, stored, transmitted and processed; Xinclude, which describes a processing model and syntax for general purpose XML inclusion; XLIFF, which is a XML Localization Interchange File Format, a format created to standardize localization; Xlink, which is a language used for creating hyperlinks in XML documents; XMI, which is an OMG standard for exchanging meta-data data via XML, which is the most common use of XMI is as an interchange format for UML models; XML Encryption, which is a specification that defines how to encrypt the content of an XML element; XML data Set, which describes an abstract data model of an XML document in terms of a set of data items; XML Interface for Network Services, which is the definition and implementation of Internet applications, enforcing a specification-oriented approach; XML Resource, which provides a platform independent way of describing windows in a GUI; XML Schema, which is a description of a type of XML document, typically expressed in terms of constraints on the structure and content of documents of that type, above and beyond the basic syntax constraints imposed by XML itself; XML Script, which is a XML transformation language, or a Microsoft technology preview for scripting web browsers; XML Signature, which is an XML syntax for digital signatures; XML for Analysis, which is used to provide data access in analytical systems, such as OLAP and Data Mining; XML pipeline: a language expressing how XML transformations are connected together; XML-RPC, which is a remote procedure call protocol which uses XML to encode its calls and HTTP as a transport mechanism; XMLmosaic, which is a programming language contained in XML code, in which the XML describes relationships between classes and contains the procedures; XMLTerm, which is a Mozilla-based Semantic User Interface; XMLTV, which is a format to represent TV listings; XMLVM, which is a format used to convert java .class files and .NET .exe files into other languages such as JavaScript or Objective-C; XOMGL, which is used to obtain large amounts of data from municipal government agencies; XOXO, which is an XML microformat for publishing outlines, lists, and blogrolls on the Web; XPDL, also known as Interchange Business Process, which describes definitions between different workflow products; XPath (or XPath 1.0); XPath 2.0, which is a language for addressing portions of XML documents, successor of XPath 1.0; Xpointer, which is a language used for addressing components of XML based Internet media; Xproc, which is a W3C standard language to describe XML Pipeline; Xquery, which is a query language designed to query collections of XML data (similar to SQL); XrML, also known as the eXtensible Rights Markup Language, or the Rights Expression Language (REL) for MPEG-21; Xrules, which is a rules language that expresses constraints, calculations, inter-dependencies, and properties that describe and exist among elements and attributes of an XML document; XSIL, which is an XML-based transport language for scientific data; XSL Formatting Objects, which is a Markup Language for XML document formatting which is most often used to generate PDFs; XSL Transformations, which is a language used for the transformation of XML documents; XSPF, which describes a play-list format for digital media; XUL, which is a XML user interface Markup Language developed by the Mozilla project; Xupdate, which is a lightweight query language for modifying XML data; or a proprietary XML schema.

Following is a simple text message body that might be sent by a person's cellphone application to the toll road authority's database. In the following example, the data in the text message body is comma delimited:

SMS, MMS, or EMS Message Body=Pay Toll, 1-88, Booth 51

Following is a simple text message body that might be sent by a person's cellphone application to the toll road authority's database. In the following example, the data in the text message is partitioned using an (*) to pack out the data, so that all data is contained in partitions that are 15 characters in length:

SMS, MMS, or EMS Message Body=Pay Toll*****1-88*****Booth 51*****

Following is a simple text message body that might be sent by a person's cellphone application to the toll road authority's database. In the following example, the data in the text message body is partitioned using Markup Language tags:

SMS, MMS, or EMS Message Body=<Do What>Pay Toll<Do What><Tollway ID>I-88<Tollway ID><Gate ID>Booth 51<Gate ID>

Embodiment 2 illustrates a flow chart of a secondary embodiment of the present invention. In this configuration, cellphones are used instead as a means to identify a vehicle to a parking authority's database in order for a driver to have their account debited for a parking charge.

A parking meter is a device used to collect money in exchange for the right to park a vehicle in a particular place for a limited amount of time. Parking meters can be used by municipalities as a tool for enforcing their integrated on-street parking policy, usually related to their traffic and mobility management policies.

Modern parking meters are generically called multi-space meters (as opposed to single space meters) and control multiple spaces per block (typically 8-12) or lot (unlimited). While with these meters the parker may have to walk several car lengths to the meter, there are significant benefits in terms of customer service, performance and efficiency. Multi-space meters incorporate more customer-friendly features such as on-screen instructions and acceptance of credit cards for payment—no longer do drivers have to have pockets full of coins on hand. They also have many performance benefits that keep them performing better. While they still may be prone to coin jams and other types of vandalism, most of these meters are wireless and can report problems immediately to maintenance staff, who can then fix the meters so that they are not out of service for very long.

With pay by space meters, the driver parks in a space, goes to the meter and enters their space number and payment. The meter memorizes the time remaining, and enforcement personnel press the bay buttons to check for violations.

This embodiment of the present invention provides a novel system, method, and apparatus for electronic parking collections. Instead of using a transponder, a driver's cellphone is used. Instead of a transponder interrogator, a cell tower in the form of a macro-cell, pico-cell, or femto-cell is used to transmit and receive wireless signals emanating from a cellphone that is switched on and operating.

As an example, if a person parking in a metered space has their cellphone turned on, the following is what happens during a toll road authority transaction:

1) Prior to parking in a metered spot, a person will power up their cellphone, which listens for an SID on the control channel. The control channel is a special frequency that the phone and base station use to communicate to one another about things like call set-up and channel changing.
2) When it receives the SID, the phone compares it to the SID programmed into the phone. If the SIDs match, the phone knows that the cell it is communicating with is part of its home system.
3) Along with the SID, the cellphone also transmits a registration request, and the MTSO keeps track of a person's phone location in a database, in this way, the MTSO knows which cell a person is in.
4) The MTSO gets an automated call from a parking authority meter, and the MTSO looks in its database to see which cell person is parking in.
5) The MTSO picks and communicates a frequency that a person's cellphone will use in that cell to receive a text message from the parking authority to the parking meter application running on the person's cellphone.
6) The person parking in a metered spot, receives a text message from the parking authority that requests a reply text that includes the space number.
7) The parking authority receives the space number, and returns a text message that includes various data, such as, but not limited to, the space number, block, the time and date, the amount of the parking meter fee, and how much money is left in their parking meter account. The text message body contains data that may be used by the person's cellphone toll road application in the form of a semi-structured, or structured message, which can be formatted such as, but not limited to data partitioning and/or comma delimited values, etc. In addition, the semi-structured, or structured message can employ tagging for additional functionality using a protocol, such as, but not limited to, Extensible Markup Language (XML) schema such as, but not limited to It is an even further object of the present invention to use and XML schema known asdsML Markup Language, which is used for interchange of data between advertising systems; Agricultural Ontology Service; AIML Markup Language, which is used for creating artificial intelligence chatterbots; Attention Profiling Markup Language (APML), which is a format for capturing a person's interests and dislikes; Atom, which is a language used for web feeds; Automated Test Markup Language (ATML), which defines a standard exchange medium for sharing data between components of automatic test systems; Attention.xml; aecXML, which is a Markup Language which uses Industry Foundation Classes to create a vendor-neutral means to access data generated by Building data Modeling; Binary Format Description Language, which is an extension of XSIL which has added conditionals and the ability to reference files by their stream numbers, rather than by their public URLs; Business Process Execution Language, which is a business process modeling language that is executable; Basic Markup Language, which is an easy to use Markup Language; Call Control eXtensible Markup Language, which is a standard designed to provide telephony support to VoiceXML; CellML, which is a language describing mathematical models; Channel Definition Format; Chemical Markup Language; Clinical Data Interchange Standards Consortium; Clinical Document Architecture; CMRL, which is a Markup Language for concise message content; COLLADA, which is standard for exchanging digital assets among various graphics software applications; Common Alerting Protocol (CAP); CookSwing; CXML, which is a protocol intended for communication of business documents between procurement applications, e-commerce hubs and suppliers; Darwin data Typing Architecture; DiagML for Integrated Diagnostics and Health Management; dicML for monolingual and bilingual dictionaries; Digital Forensics XML; Dimensional Markup Language; Directory Service Markup Language; DisplayML; DocBook: a Markup Language for technical documentation; Document Schema Definition Language; Document Structure Description, which is a schema language for XML; DotML; ebXML, which is a collection of Electronic Business specifications; eLML, which is an eLesson Markup Language; EMML Enterprise Mashup Markup Language; ENML (eNotarization Markup Language); EPPML (Extensible Postal Product Model and Language); EPUB (electronic publication, open e-book format); Extensible Application Markup Language; Extensible Data Format; Extensible Messaging and Presence Protocol; Extensible Provisioning Protocol; Extensible Resource Identifier; Extensible Stylesheet Language; FDCML (Field Device Configuration Markup Language); FicML (Fiction Markup Language); FictionBook, which is an e-book format; FieldML (Field Modelling/Markup Language); FleXML, which is an XML transformation language; FpML, which is a Financial Products Markup Language; FreebXML.org, which is an initiative that aims to foster the development and adoption of ebXML and related technology through software and experience sharing; FXT, which is a transformation specification for the Functional XML Transformation Tool; Geography Markup Language, which is a grammar defined by the Open Geospatial Consortium (OGC) to express geographical features; GJXDM, which is a data reference model for the exchange of data within the justice and public safety communities; GPX, which is a language designed for transferring GPS data between software applications; GraphML, which is a standard exchange format for graphs; GuideML; GXA, which is an extension of SOAP being worked on by Microsoft, IBM and some other developers; GXL, which is a standard exchange format for graphs; Green Building XML, also known as "gbXML", which is a schema to facilitate the transfer of building properties stored in 3D building data models (BIM) to engineering analysis tools, especially energy and building performance analysis; HelpML; HumanML, which is used for describing contextual (emotional, social, pragmatic) data about instances of human communication; data and Content Exchange; Industry Foundation Classes, which is specifically the "ifcXML" format, defined by ISO 10303-28 ("STEP-XML"), having file extension ".ifcXML", which is suitable for interoperability with XML tools and exchanging partial building models; Interactive Media Markup Language, also known as IMML, which is used to define 3D spaces in the VastPark 3D platform; Java Speech Markup Language, which is a language for annotating text input to speech synthesizers; Job Definition Format, which is a standard developed by the graphic arts industry to facilitate cross-vendor work-flow implementations; Job Submission Description Language, which describes simple tasks to non-interactive computer execution systems; Keyhole Markup Language, which is used for geographic annotation; LandXML, which is a non-proprietary standard for data exchange among the land development, civil engineering and surveying communities; Lenex, which is an exchange format for swim rankings; LGML, which is a Linguistics Markup Language, which is for describing natural languages; Link Contract; LOGML, also known as Log Markup Language, which is used for describing the log reports of web servers; Mail Markup Language (MML), which is a language describing and structuring content for email; MathML, which is a language describing mathematical notation; Medical Markup Language; Medical Reality Markup Language (MRML); Microformats, which is a piece mark up that allows expression of semantics in an HTML (or XHTML) web page; MOWL, which describes semantic interactions with multimedia content; Music Encoding Initiative (MEI), which is an XML-based language for digital representations of music notation documents; Music Markup Language; MusicXML, which is an XML-based music notation file format; MXML, which is a language used to declaratively lay-out the interface of applications, and also to implement complex business logic and rich Internet application behaviors; Namespace Routing Language; Namespace-based Validation Dispatching Language; National data Exchange Model; Nested Context Language; NeXML, which is an XML representation of the NeXus data format; NeuroML, which is a computational neuroscience model; ODD, also known as 'One Document Does-it-all' TEI format for simultaneously recording project documentation and meta-schema definition from which a person can generate RELAX NG, W3C XML Schema, and DTDs as well as formatted documentation; ODRL, which is an XML-based standard Rights Expression Language (REL) used in Digital Rights Management systems; Office Open XML, which is a Microsoft file format specification for the storage of electronic documents; OFX, also known as Open Financial Exchange, which is a unified specification for the electronic exchange of financial data between financial institutions, businesses and consumers via the Internet; OIOXML, which is an XML-Markup Language created by the Danish government to ease communication from, to and between Danish governmental instances; Open Mathematical Documents (OMDoc), based on OpenMath and MathML, but with a greater coverage; OML, which is an XML format for outlines, based on OPML; Open eBook, which is the e-book format defined by Open eBook Publication Structure Specification; superseded by ePub; Open Scripture data Standard (OSIS), which is an XML-markup schema that defines tags for marking up Bibles, theological commentaries, and other related literature; OpenDocument, which is a document file format used for describing electronic documents; OpenMath, which is a Markup Language for mathematical formulas which can complement MathML; OPML, which is an XML format for outlines; phyloXML, which is an XML for phylogenetic and phylogenomic applications; PMML, which an XML Markup Language for predictive analytics and data mining; PNML, which is also known as Petri Net Markup Language; PDBML, which is an XML Markup Language for Protein Data Bank; RailML, which is a Markup Language for interoperability in railway industry applications; RAML, which is a vocabulary for describing relational algebra expressions; RDFa; RecipeML; Regular Language; RELAX NG; Remote Telescope Markup Language; Resource Description Framework (RDF), which is a meta-data model based upon the idea of making statements about resources; RoadXML, which is a file format for driving simulator databases; RSS; RSS enclosure; S5 file format, which describes slide-show data; SAML, which is used for authentication and authorization data; SBML, which can be used to describe models of biological processes; Scalable Vector Graphics, which describes two-dimensional vector graphics; Schematron, which is an XML structure validation language for making assertions about the presence or absence of patterns in trees; SCORM, which is a Markup Language for web-based e-learning; SCXML, which provides a generic state-machine based execution environment based on Harel state-charts; Shopinfo.xml, which is used to provide shop and product data; Simple Sharing Extensions; SOAP, which is a protocol for exchanging XML-based messages over computer networks; SOAP with Attachments, which describes the method of using Web Services to send and receive files using a combination of SOAP and MIME, primarily over HTTP; Speech Application Language Tags; Speech; Synthesis Markup Language, which is a Markup Language for speech synthesis applications; SPML, which provides a user, resource and service provisioning data; StratML, which is an XML vocabulary and schema for strategic plans; Streaming Transformations for XML, which is a XML transformation language intended as a high-speed, low memory consumption alternative to XSLT; SXBL, which defines the presentation and interactive behavior of elements described in SVG; Synchronized Multimedia Integration Language, which describes multimedia presentations; Text Encoding Initiative, which describes guidelines for text encoding, with schemas and a mechanism to customize to individual project needs; ThML, also known as Theological Markup Language, created by Christian Classics Ethereal Library (CCEL), to create electronic theological texts; Topicmaps; TransducerML, which is an Open Geospatial Consortium language for describing sensors and their output; Translation Memory eXchange (TMX), which is describes translation memory data; TREX, which is a simple schema language; Twitter Markup Language (TML), which is a subset of RTML; Universal Description Discovery and Integration (UDDI), which describes a registry for businesses worldwide to list themselves on the Internet; Vector Markup Language, which is used to produce vector graphics, implemented in Microsoft Office 2000 and higher; Vexi, which is an easy-to-use platform for the development and delivery of Internet application interfaces; Video Ad Serving Template VAST, which is an IAB sponsored language for use in delivery of inline/linear and non-linear video advertising online; It is an even further object of the present invention to use and XML schema known as it is an even further object of the present invention to use and XML schema known as VoiceXML, which describes a format for specifying interactive voice dialogues between a human and a computer; W3C MMI; WDDX, also known as Web Distributed Data eXchange; Web Feed; Web Ontology Language, which is a Markup Language for defining and instantiating Web ontologies (a set of concepts within a domain and the relationships between those concepts); Web Services Flow Language, which is an XML language proposed by IBM to describe the composition of Web services, later superseded by BPEL; Web Services Description Language, which is an XML-based language that provides a model for describing Web services; Web Services Dynamic Discovery, which is a technical specification that defines a multicast discovery protocol to locate services on a local network; Wellsite data Transfer Standard Markup Language; WML, also known as Wireless Markup Language; WiX, also known as Windows Installers Data; WordprocessingML, which is a file format specification for the storage of electronic documents; WS-Policy; X3D, also known as Extensible 3D, which is an international standard for real-time 3D computer graphics, the successor to Virtual Reality Modeling Language (VRML); XAML, which is a declarative XML-based vector graphics Markup Language; XACML, also known as eXtensible Access Control Markup Language; XAP, also known as, Antenna Patterns; XBEL, which is also known as XML Bookmark Exchange Language; XBL, which is used to declare the behavior and look of 'XUL'-widgets and XML elements; XBRL, which is an open data standard for financial reporting; xCBL, which is a collection of XML specifications for use in e-business; xCal, which is the XML-compliant representation of the iCalendar standard; XCES, which is an XML based standard to codify text corpus; XDI, which is used for sharing, linking, and synchronizing data using machine-readable structured documents that use an RDF vocabulary based on XRI structured identifiers; Xduce, which is an XML transformation language; XDXF, which is used for monolingual and bilingual dictionaries; XFA, which enhances the processing of web forms; Xforms, which is a format for the specification of a data processing model for XML data and user interface(s) for the XML data, such as web forms; XFT, which is a XML language used in travel industry; XHTML, which is a Markup Language that has the same depth of expression as HTML, but with a syntax conforming to XML; XHTML Basic; XHTML Friends Network; XHTML Modularization; XidML, which is an open standard used within the flight test instrumentation industry that describes instrumentation and how data is acquired, stored, transmitted and processed; Xinclude, which describes a processing model and syntax for general purpose XML inclusion; XLIFF, which is a XML Localization Interchange File Format, a format created to standardize localization; Xlink, which is a language used for creating hyperlinks in XML documents; XMI, which is an OMG standard for exchanging meta-data data via XML, which is the most common use of XMI is as an interchange format for UML models; XML Encryption, which is a specification that defines how to encrypt the content of an XML element; XML data Set, which describes an abstract data model of an XML document in terms of a set of data items; XML Interface for Network Services, which is the definition and implementation of Internet applications, enforcing a specification-oriented approach; XML Resource, which provides a platform independent way of describing windows in a GUI; XML Schema, which is a description of a type of XML document, typically expressed in terms of constraints on the structure and content of documents of that type, above and beyond the basic syntax constraints imposed by XML itself; XML Script, which is a XML transformation language, or a Microsoft technology preview for scripting web browsers; XML Signature, which is an XML syntax for digital signatures; XML for Analysis, which is used to provide data access in analytical systems, such as OLAP and Data Mining; XML pipeline: a language expressing how XML transformations are connected together; XML-RPC, which is a remote procedure call protocol which uses XML to encode its calls and HTTP as a transport mechanism; XMLmosaic, which is a programming language contained in XML code, in which the XML describes relationships between classes and contains the procedures; XMLTerm, which is a Mozilla-based Semantic User Interface; XMLTV, which is a format to represent TV listings; XMLVM, which is a format used to convert java .class files and .NET .exe files into other languages such as JavaScript or Objective-C; XOMGL, which is used to obtain large amounts of data from municipal government agencies; XOXO, which is an XML microformat for publishing outlines, lists, and blogrolls on the Web; XPDL, also known as Interchange Business Process, which describes definitions between different workflow products; XPath (or XPath 1.0); XPath 2.0, which is a language for addressing portions of XML documents, successor of XPath 1.0; Xpointer, which is a language used for addressing components of XML based Internet media; Xproc, which is a W3C standard language to describe XML Pipeline; Xquery, which is a query language designed to query collections of XML data (similar to SQL); XrML, also known as the eXtensible Rights Markup Language, or the Rights Expression Language (REL) for MPEG-21; Xrules, which is a rules language that expresses constraints, calculations, inter-dependencies, and properties that describe and exist among elements and attributes of an XML document; XSIL, which is an XML-based transport language for scientific data; XSL Formatting Objects, which is a Markup Language for XML document formatting which is most often used to generate PDFs; XSL Transformations, which is a language used for the transformation of XML documents; XSPF, which describes a play-list format for digital media; XUL, which is a XML user interface Markup Language developed by the Mozilla project; Xupdate, which is a lightweight query language for modifying XML data; or a proprietary XML schema.

Following is a simple text message body that might be sent by the parking authority's database to a person's cellphone. In the following example, the data in the text message body includes a coupon for a restaurant in close proximity to parking space 51, and the data is comma delimited:

SMS, MMS, or EMS Message Body=Meter Paid $2.00 For Up To 4 Hrs Parking, Cedar Rapids Iowa, Space 51, Coupon For $5.00 Off Lunch At Randy's Restaurant—Coupon No. 123

Following is a simple text message body that might be sent by a person's cellphone application to the parking authority's database. In the following example, the data in the text message is partitioned using an (*) to pack out the data, so that all data is contained in partitions that are 15 characters in length:

SMS, MMS, or EMS Message Body=Pay Meter*****Cedar Rapids IASpace 51*****

Following is a simple text message body that might be sent by a person's cellphone application to the parking authority's database. In the following example, the data in the text message body is partitioned using Markup Language tags:

SMS, MMS, or EMS Message Body=<Do What>Pay Parking Meter<Do What><City State>Cedar Rapids Iowa<City State><Parking Space ID>Booth 51<Parking Space ID>

Embodiment 3 illustrates a flow chart of a secondary embodiment of the present invention. In this configuration, cellphones are used instead as a means to identify a vehicle to a parking authority's database in order for a driver to have their account debited for a parking charge.

A parking meter is a device used to collect money in exchange for the right to park a vehicle in a particular place for a limited amount of time. Parking meters can be used by municipalities as a tool for enforcing their integrated on-street parking policy, usually related to their traffic and mobility management policies.

Modern parking meters are generically called multi-space meters (as opposed to single space meters) and control multiple spaces per block (typically 8-12) or lot (unlimited). While with these meters the parker may have to walk several car lengths to the meter, there are significant benefits in terms of customer service, performance and efficiency. Multi-space meters incorporate more customer-friendly features such as on-screen instructions and acceptance of credit cards for payment—no longer do drivers have to have pockets full of coins on hand. They also have many performance benefits that keep them performing better. While they still may be prone to coin jams and other types of vandalism, most of these meters are wireless and can report problems immediately to maintenance staff, who can then fix the meters so that they are not out of service for very long.

With pay by space meters, the driver parks in a space, goes to the meter and enters their space number and payment. The meter memorizes the time remaining, and enforcement personnel press the bay buttons to check for violations.

This embodiment of the present invention provides a novel system, method, and apparatus for electronic parking collections. Instead of using a transponder, a driver's cellphone is used. Instead of a transponder interrogator, a cell tower in the form of a macro-cell, pico-cell, or femto-cell is used to transmit and receive wireless signals emanating from a cellphone that is switched on and operating.

As an example, if a person parking in a metered space has their cellphone turned on, the following is what happens during a toll road authority transaction:

8) Prior to parking in a metered spot, a person will power up their cellphone, which listens for an SID on the control channel. The control channel is a special frequency that the phone and base station use to communicate to one another about things like call set-up and channel changing.
9) When it receives the SID, the phone compares it to the SID programmed into the phone. If the SIDs match, the phone knows that the cell it is communicating with is part of its home system.
10) Along with the SID, the cellphone also transmits a registration request, and the MTSO keeps track of a person's phone location in a database, in this way, the MTSO knows which cell a person is in.
11) The MTSO gets an automated call from a parking authority meter, and the MTSO looks in its database to see which cell person is parking in.
12) The MTSO picks and communicates a frequency that a person's cellphone will use in that cell to receive a text message from the parking authority to the parking meter application running on the person's cellphone.
13) The person parking in a metered spot, receives a text message from the parking authority that requests a reply text that includes the space number.
14) The parking authority receives the space number, and returns a text message that includes various data, such as, but not limited to, the space number, block, the time and date, the amount of the parking meter fee, and how much money is left in their parking meter account. The text message body contains data that may be used by the person's cellphone toll road application in the form of a semi-structured, or structured message, which can be formatted such as, but not limited to data partitioning and/or comma delimited values, etc. In addition, the semi-structured, or structured message can employ tagging for additional functionality using a protocol, such as, but not limited to, Extensible Markup Language (XML) schema such as, but not limited to It is an even further object of the present invention to use and XML schema known asdsML Markup Language, which is used for interchange of data between advertising systems; Agricultural Ontology Service; AIML Markup Language, which is used for creating artificial intelligence chatterbots; Attention Profiling Markup Language (APML), which is a format for capturing a person's interests and dislikes; Atom, which is a language used for web feeds; Automated Test Markup Language (ATML), which defines a standard exchange medium for sharing data between components of automatic test systems; Attention.xml; aecXML, which is a Markup Language which uses Industry Foundation Classes to create a vendor-neutral means to access data generated by Building data Modeling; Binary Format Description Language, which is an extension of XSIL which has added conditionals and the ability to reference files by their stream numbers, rather than by their public URLs; Business Process Execution Language, which is a business process modeling language that is executable; Basic Markup Language, which is an easy to use Markup Language; Call Control eXtensible Markup Language, which is a standard designed to provide telephony support to VoiceXML; CellML, which is a language describing mathematical models; Channel Definition Format; Chemical Markup Language; Clinical Data Interchange Standards Consortium; Clinical Document Architecture; CMRL, which is a Markup Language for concise message content; COLLADA, which is standard for exchanging digital assets among various graphics software applications; Common Alerting Protocol (CAP); CookSwing; CXML, which is a protocol intended for communication of business documents between procurement applications, e-commerce hubs and suppliers; Darwin data Typing Architecture; Diag-ML for Integrated Diagnostics and Health Management; dicML for monolingual and bilingual dictionaries; Digital Forensics XML; Dimensional Markup Language; Directory Service Markup Language; DisplayML; DocBook: a Markup Language for technical documentation; Document Schema Definition Language; Document Structure Description, which is a schema language for XML; DotML; ebXML, which is a collection of Electronic Business specifications; eLML, which is an eLesson Markup Language; EMML Enterprise Mashup Markup Language; ENML (eNotarization Markup Language); EPPML (Extensible Postal Product Model and Language); EPUB (electronic publication, open e-book format); Extensible Application Markup Language; Extensible Data Format; Extensible Messaging and Presence Protocol; Extensible Provisioning Protocol; Extensible Resource Identifier; Extensible Stylesheet Language; FDCML (Field Device Configuration Markup Language); FicML (Fiction Markup Language); FictionBook, which is an e-book format; FieldML (Field Modelling/Markup Language); FleXML, which is an XML transformation language; FpML, which is a Financial Products Markup Language; FreebXML.org, which is an initiative that aims to foster the development and adoption of ebXML and related technology through software and experience sharing; FXT, which is a transformation specification for the Functional XML Transformation Tool; Geography Markup Language, which is a grammar defined by the Open Geospatial Consortium (OGC) to express geographical features; GJXDM, which is a data reference model for the exchange of data within the justice and public safety communities; GPX, which is a language designed for transferring GPS data between software applications; GraphML, which is a standard exchange format for graphs; GuideML; GXA, which is an extension of SOAP being worked on by Microsoft, IBM and some other developers; GXL, which is a standard exchange format for graphs; Green Building XML, also known as "gbXML", which is a schema to facilitate the transfer of building properties stored in 3D building data models (BIM) to engineering analysis tools, especially energy and building performance analysis; HelpML; HumanML, which is used for describing contextual (emotional, social, pragmatic) data about instances of human communication; data and Content Exchange; Industry Foundation Classes, which is specifically the "ifcXML" format, defined by ISO 10303-28 ("STEP-XML"), having file extension ".ifcXML", which is suitable for interoperability with XML tools and exchanging partial building models; Interactive Media Markup Language, also known as IMML, which is used to define 3D spaces in the VastPark 3D platform; Java Speech Markup Language, which is a language for annotating text input to speech synthesizers; Job Definition Format, which is a standard developed by the graphic arts industry to facilitate cross-vendor work-flow implementations; Job Submission Description Language, which describes simple tasks to non-interactive computer execution systems; Keyhole Markup Language, which is used for geographic annotation; LandXML, which is a non-proprietary standard for data exchange among the land development, civil engineering and surveying communities; Lenex, which is an exchange format for swim rankings; LGML, which is a Linguistics Markup Language, which is for describing natural languages; Link Contract; LOGML, also known as Log Markup Language, which is used for describing the log reports of web servers; Mail Markup Language (MML), which is a language describing and structuring content for email; MathML, which is a language describing mathematical notation; Medical Markup Language; Medical Reality Markup Language (MRML); Microformats, which is a piece mark up that allows expression of semantics in an HTML (or XHTML) web page; MOWL, which describes semantic interactions with multimedia content; Music Encoding Initiative (MEI), which is an XML-based language for digital representations of music notation documents; Music Markup Language; MusicXML, which is an XML-based music notation file format; MXML, which is a language used to declaratively lay-out the interface of applications, and also to implement complex business logic and rich Internet application behaviors; Namespace Routing Language; Namespace-based Validation Dispatching Language; National data Exchange Model; Nested Context Language; NeXML, which is an XML representation of the NeXus data format; NeuroML, which is a computational neuroscience model; ODD, also known as 'One Document Does-it-all' TEI format for simultaneously recording project documentation and meta-schema definition from which a person can generate RELAX NG, W3C XML Schema, and DTDs as well as formatted documentation; ODRL, which is an XML-based standard Rights Expression Language (REL) used in Digital Rights Management systems; Office Open XML, which is a Microsoft file format specification for the storage of electronic documents; OFX, also known as Open Financial Exchange, which is a unified specification for the electronic exchange of financial data between financial institutions, businesses and consumers via the Internet; OIOXML, which is an XML-Markup Language created by the Danish government to ease communication from, to and between Danish governmental instances; Open Mathematical Documents (OMDoc), based on OpenMath and MathML, but with a greater coverage; OML, which is an XML format for outlines, based on OPML; Open eBook, which is the e-book format defined by Open eBook Publication Structure Specification; superseded by ePub; Open Scripture data Standard (OSIS), which is an XML-markup schema that defines tags for marking up Bibles, theological commentaries, and other related literature; OpenDocument, which is a document file format used for describing electronic documents; OpenMath, which is a Markup Language for mathematical formulas which can complement MathML; OPML, which is an XML format for outlines; phyloXML, which is an XML for phylogenetic and phylogenomic applications; PMML, which an XML Markup Language for predictive analytics and data mining; PNML, which is also known as Petri Net Markup Language; PDBML, which is an XML Markup Language for Protein Data Bank; RailML, which is a Markup Language for interoperability in railway industry applications; RAML, which is a vocabulary for describing relational algebra expressions; RDFa; RecipeML; Regular Language; RELAX NG; Remote Telescope Markup Language; Resource Description Framework (RDF), which is a meta-data model based upon the idea of making statements about resources; RoadXML, which is a file format for driving simulator databases; RSS; RSS enclosure; S5 file format, which describes slide-show data; SAML, which is used for authentication and authorization data; SBML, which can be used to describe models of biological processes; Scalable Vector Graphics, which describes two-dimensional vector graphics; Schematron, which is an XML structure validation language for making assertions about the presence or absence of patterns in trees; SCORM, which is a Markup Language for web-based e-learning; SCXML, which provides a generic state-machine based execution environment based on Harel state-charts; Shopinfo.xml, which is used to provide shop and product data; Simple Sharing Extensions; SOAP, which is a protocol for exchanging XML-based messages over computer networks; SOAP with Attachments, which describes the method of using Web Services to send and receive files using a combination of SOAP and MIME, primarily over HTTP; Speech Application Language Tags; Speech; Synthesis Markup Language, which is a Markup Language for speech synthesis applications; SPML, which provides a user, resource and service provisioning data; StratML, which is an XML vocabulary and schema for strategic plans; Streaming Transformations for XML, which is a XML transformation language intended as a high-speed, low memory consumption alternative to XSLT; SXBL, which defines the presentation and interactive behavior of elements described in SVG; Synchronized Multimedia Integration Language, which describes multimedia presentations; Text Encoding Initiative, which describes guidelines for text encoding, with schemas and a mechanism to customize to individual project needs; ThML, also known as Theological Markup Language, created by Christian Classics Ethereal Library (CCEL), to create electronic theological texts; Topicmaps; TransducerML, which is an Open Geospatial Consortium language for describing sensors and their output; Translation Memory eXchange (TMX), which is describes translation memory data; TREX, which is a simple schema language; Twitter Markup Language (TML), which is a subset of RTML; Universal Description Discovery and Integration (UDDI), which describes a registry for businesses worldwide to list themselves on the Internet; Vector Markup Language, which is used to produce vector graphics, implemented in Microsoft Office 2000 and higher; Vexi, which is an easy-to-use platform for the development and delivery of Internet application interfaces; Video Ad Serving Template VAST, which is an IAB sponsored language for use in delivery of inline/linear and non-linear video advertising online; It is an even further object of the present invention to use and XML schema known as it is an even further object of the present invention to use and XML schema known as VoiceXML, which describes a format for specifying interactive voice dialogues between a human and a computer; W3C MMI; WDDX, also known as Web Distributed Data eXchange; Web Feed; Web Ontology Language, which is a Markup Language for defining and instantiating Web ontologies (a set of concepts within a domain and the relationships between those concepts); Web Services Flow Language, which is an XML language proposed by IBM to describe the composition of Web services, later superseded by BPEL; Web Services Description Language, which is an XML-based language that provides a model for describing Web services; Web Services Dynamic Discovery, which is a technical specification that defines a multicast discovery protocol to locate services on a local network; Wellsite data Transfer Standard Markup Language; WML, also known as Wireless Markup Language; WiX, also known as Windows Installers Data; WordprocessingML, which is a file format specification for the storage of electronic documents; WS-Policy; X3D, also known as Extensible 3D, which is an international standard for real-time 3D computer graphics, the successor to Virtual Reality Modeling Language (VRML); XAML, which is a declarative XML-based vector graphics Markup Language; XACML, also known as eXtensible Access Control Markup Language; XAP, also known as, Antenna Patterns; XBEL, which is also known as XML Bookmark Exchange Language; XBL, which is used to declare the behavior and look of 'XUL'-widgets and XML elements; XBRL, which is an open data standard for financial reporting; xCBL, which is a collection of XML specifications for use in e-business; xCal, which is the XML-compliant representation of the iCalendar standard; XCES, which is an XML based standard to codify text corpus; XDI, which is used for sharing, linking, and synchronizing data using machine-readable structured documents that use an RDF vocabulary based on XRI structured identifiers; Xduce, which is an XML transformation language; XDXF, which is used for monolingual and bilingual dictionaries; XFA, which enhances the processing of web forms; Xforms, which is a format for the specification of a data processing model for XML data and user interface(s) for the XML data, such as web forms; XFT, which is a XML language used in travel industry; XHTML, which is a Markup Language that has the same depth of expression as HTML, but with a syntax conforming to XML; XHTML Basic; XHTML Friends Network; XHTML Modularization; XidML, which is an open standard used within the flight test instrumentation industry that describes instrumentation and how data is acquired, stored, transmitted and processed; Xinclude, which describes a processing model and syntax for general purpose XML inclusion; XLIFF, which is a XML Localization Interchange File Format, a format created to standardize localization; Xlink, which is a language used for creating hyperlinks in XML documents; XMI, which is an OMG standard for exchanging meta-data data via XML, which is the most common use of XMI is as an interchange format for UML models; XML Encryption, which is a specification that defines how to encrypt the content of an XML element; XML data Set, which describes an abstract data model of an XML document in terms of a set of data items; XML Interface for Network Services, which is the definition and implementation of Internet applications, enforcing a specification-oriented approach; XML Resource, which provides a platform independent way of describing windows in a GUI; XML Schema, which is a description of a type of XML document, typically expressed in terms of constraints on the structure and content of documents of that type, above and beyond the basic syntax constraints imposed by XML itself; XML Script, which is a XML transformation language, or a Microsoft technology preview for scripting web browsers; XML Signature, which is an XML syntax for digital signatures; XML for Analysis, which is used to provide data access in analytical systems, such as OLAP and Data Mining; XML pipeline: a language expressing how XML transformations are connected together; XML-RPC, which is a remote procedure call protocol which uses XML to encode its calls and HTTP as a transport mechanism; XMLmosaic, which is a programming language contained in XML code, in which the XML describes relationships between classes and contains the procedures; XMLTerm, which is a Mozilla-based Semantic User Interface; XMLTV, which is a format to represent TV listings; XMLVM, which is a format used to convert java .class files and .NET .exe files into other languages such as JavaScript or Objective-C; XOMGL, which is used to obtain large amounts of data from municipal government agencies; XOXO, which is an XML microformat for publishing outlines, lists, and blogrolls on the Web; XPDL, also known as Interchange Business Process, which describes definitions between different workflow products; XPath (or XPath 1.0); XPath 2.0, which is a language for addressing portions of XML documents, successor of XPath 1.0; Xpointer, which is a language used for addressing components of XML based Internet media; Xproc, which is a W3C standard language to describe XML Pipeline; Xquery, which is a query language designed to query collections of XML data (similar to SQL); XrML, also known as the eXtensible Rights Markup Language, or the Rights Expression Language (REL) for MPEG-21; Xrules, which is a rules language that expresses constraints, calculations, inter-dependencies, and properties that describe and exist among elements and attributes of an XML document; XSIL, which is an XML-based transport language for scientific data; XSL Formatting Objects, which is a Markup Language for XML document formatting which is most often used to generate PDFs; XSL Transformations, which is a language used for the transformation of XML documents; XSPF, which describes a play-list format for digital media; XUL, which is a XML user interface Markup Language developed by the Mozilla project; Xupdate, which is a lightweight query language for modifying XML data; or a proprietary XML schema.

Following is a simple text message body that might be sent by the parking authority's database to a person's cellphone. In the following example, the data in the text message body includes a coupon for a restaurant in close proximity to parking space 51, and the data is comma delimited:

Following is a simple text message body that might be sent by the parking authority's database to a person's cellphone. In the following example, the data in the text message body includes a coupon for a restaurant in close proximity to parking space 51, and the data is comma delimited:

SMS, MMS, or EMS Message Body=Meter Paid $2.00 For Up To 4 Hrs Parking, Cedar Rapids Iowa, Space 51, Coupon For $5.00 At Randy's Restaurant—Coupon No. 12345678

The coupon described in the preceding example, can be distributed from a novel web-based application that is a hybrid real world and virtual world marketing and advertising system that is agile, can employ virtually any single or combination of marketing and advertising methods, such as, but not limited to, cross-branding, ambush marketing, article marketing, article video marketing, digital market, direct marketing, diversity marketing, mega-marketing, multi-level marketing, cause marketing, close range marketing, cloud marketing, communal marketing, consumer-generated marketing, cross-media marketing, customer advocacy marketing, database marketing, ethical marketing, evangelism marketing, Embodiment of merit marketing, global marketing, guerrilla marketing, inbound marketing, influencer marketing, Internet marketing, nanocampaign marketing, next best action marketing, permission marketing, proximity marketing, reality marketing, relationship marketing, shopper marketing, undercover marketing, loyalty marketing, etc, uses on-demand printing, and existing methods of free delivery of real world objects as a means of free delivery of hard copy advertising and marketing materials to a consumer, including a system for coupon exchange.

In the widest sense, a coupon is defined as: a ticket or document that can be exchanged for a financial discount or rebate when purchasing a product. Customarily, coupons are issued by manufacturers of consumer packaged goods or by retailers, to be used in retail stores as a part of sales promotions. They are often widely distributed through mail, magazines, newspapers, the Internet, directly from the retailer, and mobile devices such as cellphones. Since only price conscious consumers are likely to spend the time to claim the savings, coupons function as a form of price discrimination, enabling retailers to offer a lower price only to those consumers who would otherwise go elsewhere.

In addition, coupons can also be targeted selectively to regional markets in which price competition is great. Coupons can be used to research the price sensitivity of different groups of buyers (by sending out coupons with different dollar values to different groups). In addition, it is generally assumed that buyers who take the effort to collect and use coupons are more price sensitive than those who do not. Therefore, the posted price paid by price-insensitive buyers can be increased, while using coupon discounts to maintain the price for price-sensitive buyers (who would not buy at a higher price).

Customers may get these coupons from various sources, including national newspapers and the Internet, with web sites offering free printable grocery coupons can be printed at home and use them at retail store. Some major grocery chains also produce digital coupons that may be loaded onto the retailer's store card at home, or at a coupon dispensing machine located in store.

Many retailers and companies now offer protection from unauthorized copying or use via several verification methods including unique barcodes and coupon ID numbers, holographic seals, and watermarked paper.

Online retailers often refer to coupons as "coupon codes," "promotional codes," "promotion codes," "discount codes," "key codes," "promo codes," "surplus codes," "portable codes," "shopping codes," "voucher codes," "reward codes" "discount vouchers" or "source codes." Internet coupons typically provide for reduced cost or free shipping, a specific dollar or percentage discount, or some other offer to encourage consumers to purchase specific products or to purchase from specific retailers. Because paper coupons would be difficult to redeem, typically secret words or codes are distributed for consumers to type in at checkout. Marketers can use different codes for different channels our groups in order to distinguish response rates.

A Mobile coupon is an electronic ticket solicited and or delivered to a mobile phone that can be exchanged for financial discount or rebate when purchasing product or service. Customarily coupon are issued by manufacturers of consumer packaged goods or retailers, to be used in retail stores as part of a sales promotion. They are often distributed through WAP Push over SMS, MMS, EMS, or other mobile means. The customer redeems the coupon at store or online. In some cases the customer redeems the mobile coupon at store; some retailers forward the redemption to a clearinghouse for final processing.

The coupons can be traded in an online exchange, by which coupons for goods or services are directly exchanged for other coupons for goods or services without using a medium of exchange, such as money. The coupon exchange system can operate bilaterally, and also multilaterally. The coupon exchange is a sophisticated tool that can help businesses increase their efficiencies by monetizing their unused capacities and excess inventories. The coupon exchange also helps consumers by allowing them to pick and choose which coupons are most meaningful for their own needs.

It should be understood that the Embodiments and the specific description thereof set forth in this application are for the purpose of illustrating the present invention and are not to be construed as limiting the present invention to the precise and detailed specific structure shown in the Embodiments and specifically described herein. The present invention is intended to include substantially equivalent constructions embodying the basic teachings and inventive concept of the present invention.

What is claimed is:

1. A method of using a short message service (SMS) text message body to store, and communicate at least one tagged data set, the method comprising:
    storing the SMS text message body in a machine readable memory of a first mobile device, wherein the SMS text message body comprises a plurality of partitions and wherein one of the partitions comprises data elements represented as tagged text data, the tagged text data comprising a unique coupon identifier for a mobile coupon, a value for the mobile coupon, and a retailer for redeeming the mobile coupon;
    communicating an SMS text message comprising the SMS text message body from the first mobile device to a second mobile device configured to receive the SMS text message to transfer the mobile coupon from the first mobile device to the second mobile device in a coupon exchange;
    using the tagged data received from the SMS text message, including the unique coupon identifier, at the second device to redeem the mobile coupon at the retailer.

2. The method of claim 1 wherein the communicating is performed by a cellular wireless technology.

3. The method of claim 1 wherein the tagged text data further comprises a purchase associated with a user of the first mobile device.

4. The method of claim 3 wherein the tagged text data further comprises a location associated with the user of the first mobile device.

5. The method of claim 1 wherein the tagged text data is tagged with XML data tags.

6. The method of claim 1 wherein one of the partitions comprises a data structure schema selected from the set consisting of: RFID, EDI, and bar code.

7. The method of claim 1 wherein the SMS text message body is represented as a machine readable code.

8. The method of claim 7 wherein the machine readable code is a bar code.

* * * * *